US012809940B2

(12) United States Patent
Lomen et al.

(10) Patent No.: US 12,809,940 B2
(45) Date of Patent: Nov. 24, 2026

(54) SIGNAL SORTING AND EVALUATION TECHNIQUES

(71) Applicant: BAE SYSTEMS Information and Electronic Systems Integration Inc., Nashua, NH (US)

(72) Inventors: Brandt J Lomen, Bedford, NH (US); Michael C Caron, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 660 days.

(21) Appl. No.: 18/066,390

(22) Filed: Dec. 15, 2022

(65) Prior Publication Data

US 2024/0202278 A1 Jun. 20, 2024

(51) Int. Cl.
*G06F 18/23* (2023.01)
*G06F 17/18* (2006.01)
*G06F 18/231* (2023.01)

(52) U.S. Cl.
CPC .............. *G06F 18/23* (2023.01); *G06F 17/18* (2013.01); *G06F 18/231* (2023.01); *G06F 2216/03* (2013.01)

(58) Field of Classification Search
CPC combination set(s) only.
See application file for complete search history.

(56) References Cited

U.S. PATENT DOCUMENTS 7,269,538 B1 9/2007 O'Brien, Jr.
7,991,578 B2 8/2011 Lee
8,805,858 B1 8/2014 Ray
8,902,792 B2 12/2014 Ferre et al.
(Continued)

FOREIGN PATENT DOCUMENTS

EP 2676189 B1 10/2014
WO 2018009887 A1 1/2018

OTHER PUBLICATIONS

Liao et al., "A Grid-based Clustering Algorithm using Adaptive Mesh Refinement" 7th workshop on mining scientific and engineering datasets of SIAM international conference on data mining. vol. 22. 2004 (Year: 2004).*

(Continued)

*Primary Examiner* — John C Kuan
(74) *Attorney, Agent, or Firm* — Gary McFaline

(57) ABSTRACT

Systems and methods for sorting signals. One example of a method includes receiving a plurality of data vectors representing a plurality of signals, establishing a sparse primary grid including at least one primary cell in which at least one data vector has been received, based on a first number of data vectors received within the primary cell exceeding a first threshold value, establishing a sparse secondary grid within the primary cell, the sparse secondary grid including at least one secondary cell in which one or more data vectors have been received, based on a second number of data vectors received within the at least one secondary cell exceeding a second threshold value, establishing a first smart object corresponding to the at least one secondary cell, and associating the one or more data vectors received within the at least one secondary cell with the first smart object.

17 Claims, 13 Drawing Sheets

(56) References Cited

U.S. PATENT DOCUMENTS

| | | | | |
|---|---|---|---|---|
| 9,058,540 | B2 | 6/2015 | Wu et al. | |
| 9,177,215 | B2 | 11/2015 | Ferre et al. | |
| 9,689,959 | B2 | 6/2017 | Asaei et al. | |
| 10,121,094 | B2 | 11/2018 | Aas et al. | |
| 10,169,386 | B2 | 1/2019 | Feng et al. | |
| 10,379,813 | B1 | 8/2019 | Ghanekar et al. | |
| 11,341,235 | B2 | 5/2022 | Jaenisch et al. | |
| 11,354,547 | B2 | 6/2022 | Delp et al. | |
| 2008/0154942 | A1 | 6/2008 | Tsai et al. | |
| 2009/0112514 | A1* | 4/2009 | Lee | G06F 18/23 702/179 |
| 2014/0112201 | A1 | 4/2014 | Ferre et al. | |
| 2014/0164402 | A1 | 6/2014 | Haws et al. | |
| 2014/0201339 | A1 | 7/2014 | Rammos et al. | |
| 2017/0168990 | A1* | 6/2017 | Kernert | G06F 17/16 |

OTHER PUBLICATIONS

Peherstorfer et al., "Clustering Based on Density Estimation with Sparse Grids" B. Glimm and A. Kruger (Eds.): KI 2012, LNCS 7526, pp. 131-142, 2012 (Year: 2012).*

* cited by examiner

SIGNAL SORTING AND EVALUATION TECHNIQUES

STATEMENT OF GOVERNMENT INTEREST

This invention was made with United States Government assistance under Contract No. [withheld], awarded by [federal agency withheld]. The United States Government has certain rights in this invention.

FIELD OF DISCLOSURE

The present disclosure relates to signal processing, and more particularly, to techniques for sorting and evaluating signal data.

BACKGROUND

Analyzing vast data sets consumes an enormous amount of computing resources. In complex signal environments, there may be so many signals present that the computing resources required to analyze all the signals is prohibitive. Signal clustering is a common signal analysis tool used to reduce data sets for subsequent analysis. A signal clustering algorithm can group signals with one or more similar properties to form groups that can then be analyzed/processed as a whole, thereby reducing the number of items to be processed. However, some signal environments are so large and/or complex that, even applying existing signal clustering techniques, computing systems struggle to handle the signal volume. Therefore, non-trivial issues remain with respect to signal sorting and analysis techniques.

SUMMARY

Aspects and embodiments are directed to signal sorting and evaluation techniques that may be capable of operating in domains having very high signal rates.

According to one embodiment, a method of sorting signals comprises receiving, via a signal receiver, a plurality of data vectors representing a plurality of signals, establishing a sparse primary grid over an operation space of the signal receiver, the sparse primary grid including at least one primary cell in which at least one data vector of the plurality of data vectors has been received, based on a first number of data vectors received within the primary cell exceeding a first threshold value, establishing a sparse secondary grid within the primary cell, the sparse secondary grid including at least one secondary cell in which one or more data vectors of the at least one data vector have been received, based on a second number of data vectors received within the at least one secondary cell exceeding a second threshold value, establishing a first smart object corresponding to the at least one secondary cell, and associating the one or more data vectors received within the at least one secondary cell with the first smart object.

Examples of the method may include any one or more of the following features.

In one example, establishing the sparse primary grid includes establishing the sparse primary grid having first and second orthogonal primary axes corresponding, respectively, to first and second parameters of the plurality of data vectors, and establishing the sparse secondary grid includes establishing the sparse secondary grid having first and second orthogonal secondary axes corresponding, respectively, to the first and second parameters of the plurality of data vectors. In one example, establishing the secondary grid includes establishing the secondary grid having a third orthogonal secondary axis corresponding to a third parameter of the plurality of data vectors.

In one example, establishing the first smart object includes associating any secondary cells disposed adjacent to the at least secondary cell and having collected at least one data vector of the plurality of data vectors with the first object.

In one example, the at least one primary cell records the first number of data vectors received within the at least one primary cell and a time of receipt of a most recently received data vector within the at least one primary cell. The method may further comprise deleting the at least one primary cell based on an amount of time, measured since the time of receipt and during which no further data vectors are received within the at least one primary cell, exceeding a predetermined threshold.

In another example, the method further comprises establishing a second smart object based on a third number of data vectors received within an additional secondary cell exceeding the second threshold value. The method may further comprise determining that the first and second smart objects share a common boundary, determining that the first and second smart objects were not previously merged, and merging the first and second smart objects to form a single third smart object.

In another example, the method further comprises determining that the first smart object contains two or more distributions of data vectors, determining a divergence between the two or more distributions of data vectors, and based on the divergence exceeding a predetermined threshold, splitting the first smart object into multiple smart objects, each smart object of the multiple smart objects being associated with one of the two or more distributions. In one example, splitting the first smart object into multiple smart objects includes evaluating, for each secondary cell associated with the first smart object, probabilities that the secondary cell corresponds to each of the two or more distributions, and based on the probabilities, assigning each secondary cell to one of the two or more distributions. In another example, determining that the first smart object contains two more distributions of data vectors includes forming a Chi-square goodness of fit test on a dataset corresponding to the first smart object, the data set including the one or more data vectors associated with the first smart object.

According to another embodiment, there is provided a computer readable medium encoded with instructions executable by one or more processors to implement any examples of the method as discussed above.

Another embodiment is directed to a signal sorting system comprising at least one signal receiver configured to receive a plurality of signals, a data storage, and at least one processor coupled to the data storage and configured to execute a process comprising receiving, via the at least one signal receiver, a plurality of data vectors representing the plurality of signals, establishing a sparse primary grid over an operation space of the signal receiver, the sparse primary grid including at least one primary cell in which at least one data vector of the plurality of data vectors has been received, based on a first number of data vectors received within the primary cell exceeding a first threshold value, establishing a sparse secondary grid within the primary cell, the sparse secondary grid including at least one secondary cell in which one or more data vectors of the at least one data vector have been received, based on a second number of data vectors received within the at least one secondary cell exceeding a second threshold value, establishing a first smart object corresponding to the at least one secondary cell, and associating the one or more data vectors received within the at least one secondary cell with the first smart object.

In one example, the sparse primary grid has first and second orthogonal primary axes corresponding, respectively, to first and second parameters of the plurality of data vectors, and the sparse secondary grid has first, second, and third orthogonal secondary axes, the first and second secondary axes corresponding, respectively, to the first and second parameters of the plurality of data vectors, and the third secondary axis corresponding to a third parameter of the plurality of data vectors.

In another example, establishing the first smart object includes associating any secondary cells disposed adjacent to the at least secondary cell and having collected at least one data vector of the plurality of data vectors with the first object.

In another example, the at least one processor is configured to store, in the data storage, information corresponding to the at least one primary cell, the information including the first number of data vectors received within the at least one primary cell and a time of receipt of a most recently received data vector within the at least one primary cell. In one example, the at least one processor is further configured to delete from the data storage the information corresponding to the at least one primary cell based on an amount of time, measured since the time of receipt and during which no further data vectors are received within the at least one primary cell, exceeding a predetermined threshold.

In another example, the process executed by the at least one processor further comprises establishing a second smart object based on a third number of data vectors received within an additional secondary cell exceeding the second threshold value, determining that the first and second smart objects share a common boundary, determining that the first and second smart objects were not previously merged, and merging the first and second smart objects to form a single third smart object.

In another example, the process executed by the at least one processor further comprises determining that the first smart object contains two or more distributions of data vectors, determining a divergence between the two or more distributions of data vectors, and based on the divergence exceeding a predetermined threshold, splitting the first smart object into multiple smart objects, each smart object of the multiple smart objects being associated with one of the two or more distributions. In one example, splitting the first smart object into multiple smart objects includes evaluating, for each secondary cell associated with the first smart object, probabilities that the secondary cell corresponds to each of the two or more distributions; and based on the probabilities, assigning each secondary cell to one of the two or more distributions. In another example, determining that the first smart object contains two more distributions of data vectors includes forming a Chi-square goodness of fit test on a dataset corresponding to the first smart object, the data set including the one or more data vectors associated with the first smart object.

Another embodiment is directed to a computer program product including one or more machine-readable mediums encoded with instructions that when executed by one or more processors cause a process to be carried out for sorting signals. The process comprises receiving, via a signal receiver, a plurality of data vectors representing a plurality of signals, establishing a sparse primary grid over an operation space of the signal receiver, the sparse primary grid including at least one primary cell in which at least one data vector of the plurality of data vectors has been received, based on a first number of data vectors received within the primary cell exceeding a first threshold value, establishing a sparse secondary grid within the primary cell, the sparse secondary grid including at least one secondary cell in which one or more data vectors of the at least one data vector have been received, based on a second number of data vectors received within the at least one secondary cell exceeding a second threshold value, establishing a first smart object corresponding to the at least one secondary cell, and associating the one or more data vectors received within the at least one secondary cell with the first smart object.

In one example, establishing the sparse primary grid includes establishing the sparse primary grid having first and second orthogonal primary axes corresponding, respectively, to first and second parameters of the plurality of data vectors, and establishing the sparse secondary grid includes establishing the sparse secondary grid having first, second, and third orthogonal secondary axes, the first and second secondary axes corresponding, respectively, to the first and second parameters of the plurality of data vectors, and the third secondary axis corresponding to a third parameter of the plurality of data vectors.

In another example, establishing the first smart object includes associating any secondary cells disposed adjacent to the at least secondary cell and having collected at least one data vector of the plurality of data vectors with the first object.

In another example, the at least one primary cell records the first number of data vectors received within the at least one primary cell and a time of receipt of a most recently received data vector within the at least one primary cell. The process may further comprise deleting the at least one primary cell based on an amount of time, measured since the time of receipt and during which no further data vectors are received within the at least one primary cell, exceeding a predetermined threshold.

In one example, the process further comprises establishing a second smart object based on a third number of data vectors received within an additional secondary cell exceeding the second threshold value, determining that the first and second smart objects share a common boundary, determining that the first and second smart objects were not previously merged, and merging the first and second smart objects to form a single third smart object.

In another example, the process further comprises determining that the first smart object contains two or more distributions of data vectors, determining a divergence between the two or more distributions of data vectors, and based on the divergence exceeding a predetermined threshold, splitting the first smart object into multiple smart objects, each smart object of the multiple smart objects being associated with one of the two or more distributions. In one example, splitting the first smart object into multiple smart objects includes evaluating, for each secondary cell associated with the first smart object, probabilities that the secondary cell corresponds to each of the two or more distributions, and based on the probabilities, assigning each secondary cell to one of the two or more distributions. In another example, determining that the first smart object contains two more distributions of data vectors includes forming a Chi-square goodness of fit test on a dataset corresponding to the first smart object, the data set including the one or more data vectors associated with the first smart object.

Still other aspects, embodiments, and advantages of these example aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

Figure 1:
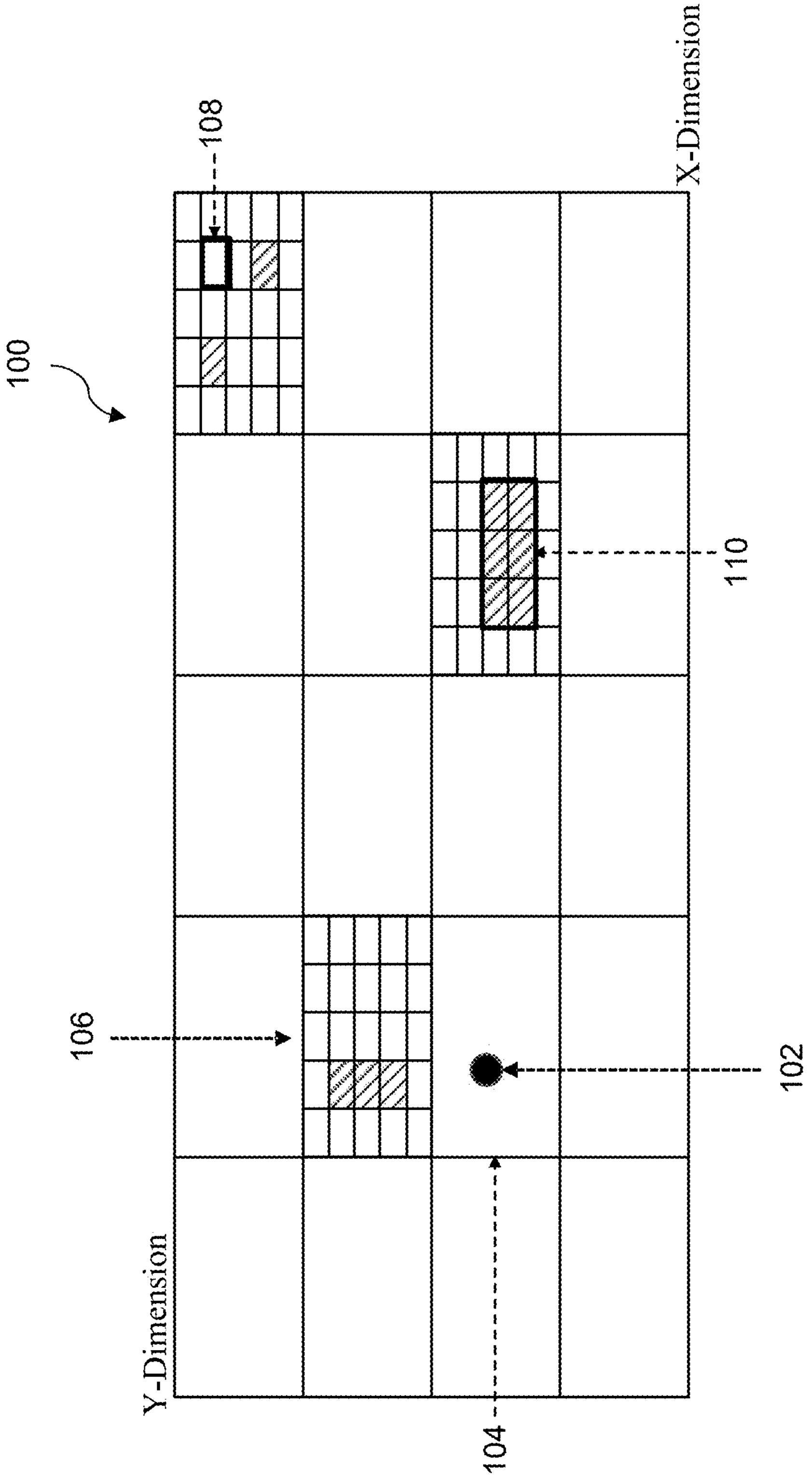
FIG. 1 is a diagram illustrating an example operation space in which signal sorting processes according to aspects of the present disclosure are implemented.

Although the following detailed description will proceed with reference being made to illustrative embodiments, many alternatives, modifications, and variations thereof will be apparent in light of this disclosure.

DETAILED DESCRIPTION

Aspects and embodiments are directed to systems and methods for implementing signal sorting and evaluation processes that can efficiently and correctly characterize signal densities within unknown environments.

In accordance with one embodiment, a method is provided for sorting signals, the method including receiving, by a processor and via a signal receiver, a plurality of data vectors representing a plurality of signals, and establishing a sparse primary grid over an operation space of the signal receiver, the sparse primary grid including at least one primary cell in which at least one data vector of the plurality of data vectors has been received. The method may further include, based on a first number of data vectors received within the primary cell exceeding a first threshold value, establishing a sparse secondary grid within the primary cell, the sparse secondary grid including at least one secondary cell in which one or more data vectors of the at least one data vector have been received, based on a second number of data vectors received within the at least one secondary cell exceeding a second threshold value, establishing a first smart object corresponding to the at least one secondary cell, and associating the one or more data vectors received within the at least one secondary cell with the first smart object.

As noted above, there are non-trivial problems associated with signal sorting and analyzing large data sets of many signals. In particular, there exists a need for a signal sorting process that can operate efficiently enough to handle high signal rates. According to certain aspects, techniques are provided to address this need and provide computationally efficient and effective processes for signal sorting in high data rate environments. In this context, "efficiency" refers to minimizing, or at least reducing relative to processing raw signal data, processing time and memory use in computing systems implementing examples of the processes disclosed herein. The disclosed techniques can be used with any type of signals or data, including those associated with multi-dataset systems such as large communication or sensor networks. Additionally, examples of the processes disclosed herein can be implemented in firmware applications, making these techniques potentially valuable technology for many integrated systems. In contrast to some conventional signal clustering algorithms which categorize all signals within a given environment into groups, and thus treat all signals as "relevant," an example of the present disclosure applies filtering techniques, using the primary and secondary cells, to prioritize signal grouping and focus analysis on areas of interest. In this manner, valuable computing resources can be reserved for analyzing higher-interest/higher-priority signals (which are assigned to smart objects), while relatively computationally "cheap" processes can be used to filter out clutter.

According to certain aspects, techniques disclosed herein may be used to leverage the realization that in many signal domains, only a small portion of the operation space is utilized. For example, in some instances, only 15% or less of the total operation space may contain relevant information. However, in many applications, excess signals in an environment can bog down processing time and complicate analysis. In accordance with some examples, signals are filtered based on signal density within certain regions of the operation space so as to reduce the amount of information to be processed across a given operation space and concentrate analysis on regions of interest that potentially contain relevant information. As discussed in more detail below, according to some examples, primary and secondary grids can be established over the operation space, and individual cells within each grid reduce signals in those cells into the least amount of information: that a signal existed in that region. The signal receiver receives signals over the operation space, and as each signal is received, it is assigned to a primary cell that corresponds to that signal's location in the operation space. Once the signal density (e.g., number of signals received) within a primary cell exceeds a certain threshold, a secondary grid is established within that primary cell. As signals continue to be received within the primary cell, those signals are assigned to secondary cells (based on each signal's location within the primary cell) in the secondary grid corresponding to that primary cell. Once the signal density within a given secondary cell or collection of secondary cells in the secondary grid exceeds a certain threshold, those secondary cell are "promoted" to become one or more "smart objects," as discussed further below. The smart objects may store additional signal information, and signal analysis can be focused on the smart objects. According to certain examples, the smart objects may be highly customizable in terms of both the signal information stored and the type of signal analysis and processing that may be performed on the information stored in a smart object.

Thus, establishment of the primary cells acts as a first-level "course" filter, that narrows down the portion of the operation space in which secondary grids are formed to those areas that have a certain signal density, indicating that the area, or signals within that area, may be of more interest. Similarly, the secondary grid acts as a next-level filter, further narrowing or focusing the portion of the operation space in which significant processing is to be performed (those areas associated with smart objects) to the one or more secondary cells that have higher signal density. In this manner, only the signals in areas with relatively high signal density become associated with smart objects where computing resources can be focused for analysis.

Referring to FIG. 1, in accordance with one embodiment, the system begins with an empty primary grid 100 that defines an overall operation space. As signals 102 are entered into the system, primary cells 104 may be created where the signals 102 are received using "sparse grids" which only creates a cell within a grid when necessary. This allows the primary grid to be represented by only the primary cells 104 that contain a signal 102; rather than by the complete grid of N by M cells. Within the primary cells 104, a finer secondary sparse grid 106 of secondary cells 108 may be created. In the illustrated example, the secondary grid 106 is a five-by-five grid; however, in various examples the secondary grid 106 may be an N by M grid, with N and M being any integer numbers. In certain examples, the secondary grid 106 may add additional dimensions. For example, while the primary grid 100 may be X/Y, the secondary grid 106 may be X/Y/Z to allow for extra granular filters. It will be appreciated that the X, Y, and optionally Z, dimensions may represent any signal parameters, as discussed further below, and do not necessarily refer to spatial coordinates.

According to certain examples, once the signal density within a given secondary cell 108 reaches a predetermined threshold, the secondary cell 106 may become a smart object 110. A single smart object 110 may cover multiple secondary cells 106, as shown in FIG. 1. Smart objects 110 may exist as a configurable-in-depth analysis of the sorted signals 102 that are collected into the smart object 110. Once signals 102 begin to reach smart objects 110, it may be assumed that those signals are "important" to the system. Thus, the system can be configured to have one or more processors associated with the smart objects 110 perform extended processing on these particular signals 102, instead of processing every signal 102 collected in the operation space.

The effect of this methodology is that instead of having to create N-dimensional histograms over an entire operational range, only a small fraction of the information has to be recorded. This allows computationally "cheap" methods to determine where important information exists, saving the remaining computational resources for the important information.

Example Signal Sorting System

Figure 2:
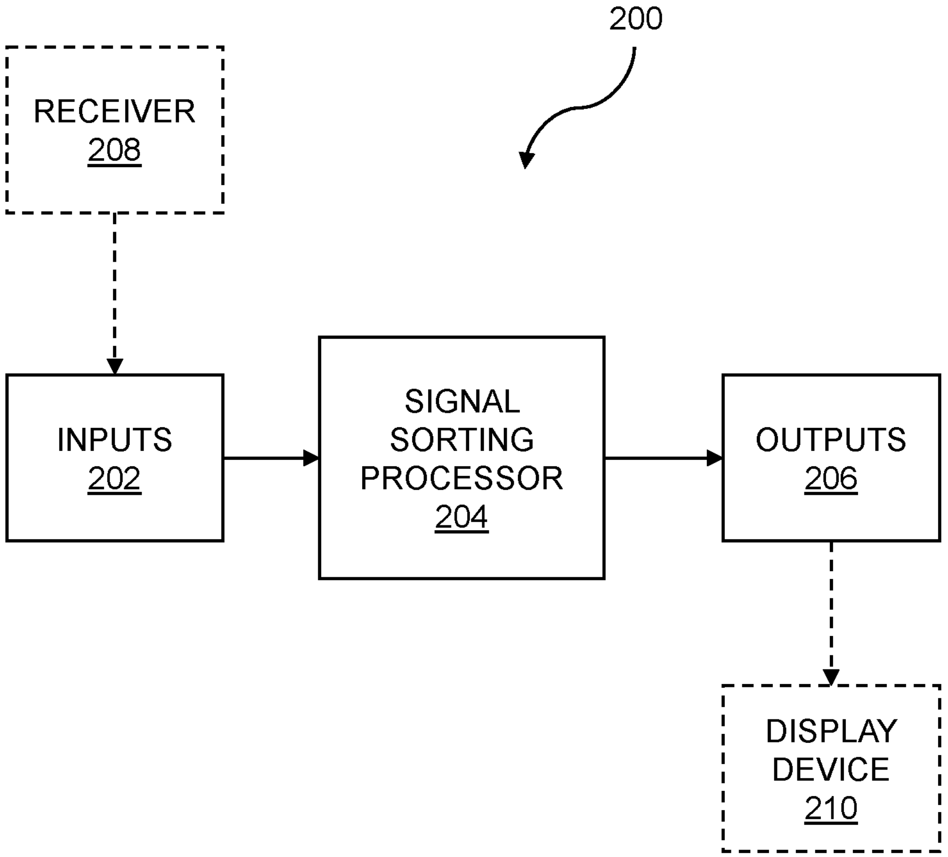
FIG. 2 is a block diagram of an example system for signal sorting and evaluation, in accordance with aspects of the present disclosure.

FIG. 2 is a block diagram of an example system 200 for signal sorting and evaluation, in accordance with aspects of the present disclosure. The system 200 includes a signal sorting processor 204 configured to receive inputs 202 and to produce outputs 206. The inputs 202 and the outputs 204 include vectors of data. In some examples, the inputs 202 represent signals received via a signal receiver 208 (e.g., an electronic device for accepting signals and converting the signals into data), although it will be understood that the inputs 202 can represent any type of data received from any source, such as a radar, antenna, camera, sensor, oscilloscope, electronic test instrument, or other device that generates or otherwise produces electronic signals. In some examples, the outputs 206 (optionally after further processing) are provided to a display device 210 (e.g., a monitor or printer) in a human readable format. In other examples, the outputs 206 are provided to other system components, or to devices or systems external to the system 200, for further processing, analysis, and/or other use by the other components, devices, or systems.

In some embodiments, the system 200 can be used in tactical networks including, but not limited to, intelligence, surveillance and reconnaissance (ISR) networks for ensuring reliable operation and situational awareness, Blue Force Tracking (BFT) systems for reducing incidents of friendly fire, electronic warfare (EW) systems for maintaining reliable electronic attack and support operations, and other network-centric operations for enhanced effectiveness.

As discussed in more detail below, the signal sorting processor 204 applies the signal sorting and evaluation processes disclosed herein to the inputs 202 to create the primary and secondary grids, and to group cells to form, as outputs 206, smart objects that can contain information for further processing. In accordance with certain examples, the signal sorting processor 204 may also perform processes to merge smart objects together in certain circumstances, and to separate a smart object into two or more independent smart objects in other circumstances, as discussed in more detail below. In some instances, the outputs 206 representing smart objects can be provided to one or more additional processors (not shown) for further processing before being provided to the display device 210. In other instances, the signal sorting processor 204 may further process the smart objects to obtain other data that is then provided as the outputs 206 and optionally delivered to the display device 210.

Other componentry and functionality not reflected in FIG. 2 will be apparent in light of this disclosure, and it will be appreciated that other embodiments are not limited to any particular hardware configuration. For example, the signal sorting processor 204 is configured to perform the various processes and functions such as described herein and with respect to FIGS. 2-11. The processor 204 can be any suitable processor and may include one or more coprocessors or controllers. In some embodiments, the processor 204 can be implemented as any number of processor cores. The processor 204 (or processor cores) can be any type of processor, such as, for example, a micro-processor, an embedded processor, a digital signal processor (DSP), a graphics processor (GPU), a network processor, a field programmable gate array or other device configured to execute code. The processor 204 can include multithreaded cores in that they may include more than one hardware thread context (or "logical processor") per core. The processor 204 can be implemented as a complex instruction set computer (CISC) or a reduced instruction set computer (RISC) processor.

The processor 204 can be configured to execute an operating system (OS), such as Google Android (by Google Inc. of Mountain View, Calif.), Microsoft Windows (by Microsoft Corp. of Redmond, Wash.), Apple OS X (by Apple Inc. of Cupertino, Calif.), Linux, or a real-time operating system (RTOS). As will be appreciated in light of this disclosure, the techniques provided herein can be implemented without regard to the particular operating system provided in conjunction with the system 200, and therefore may also be implemented using any suitable existing systems or platforms. It will be appreciated that in some embodiments, some of the various components of the system 200 can be combined or integrated in a system-on-a-chip (SoC) architecture. In some embodiments, the components may be hardware components, firmware components, software components or any suitable combination of hardware, firmware or software.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

Example Signal Sorting Processes

Figure 3A:
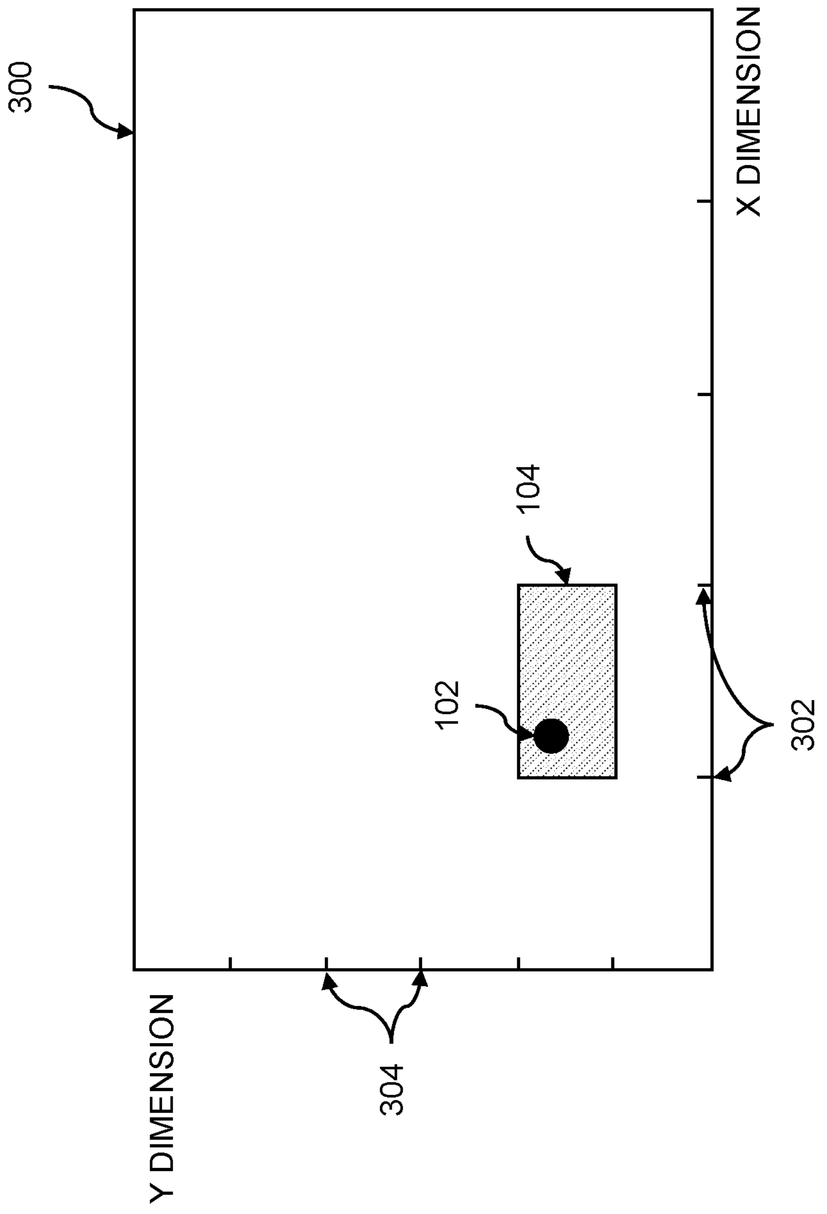
FIG. 3A is a diagram illustrating a representation of an example operation space according to aspects of the present disclosure.
Figure 3B:
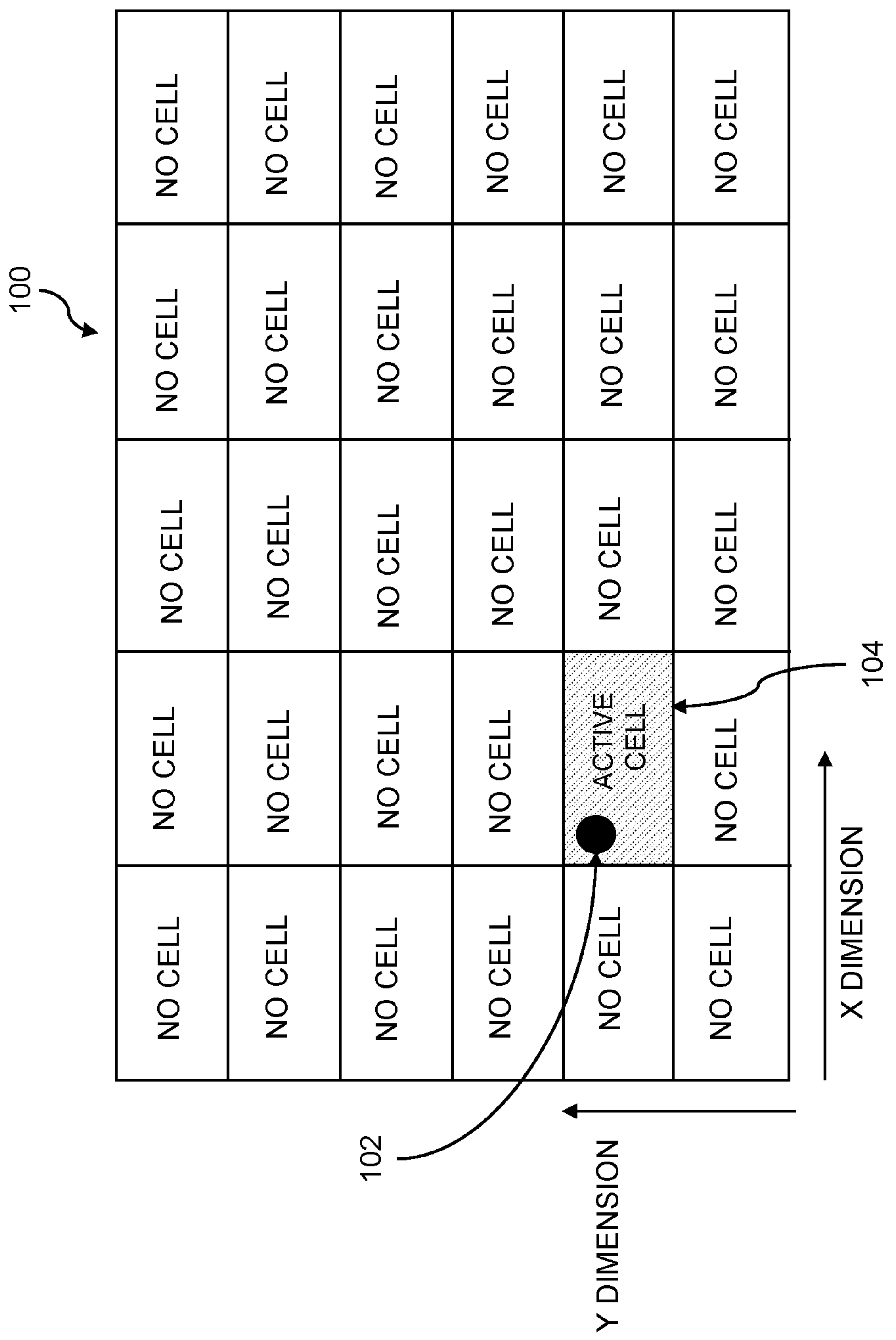
FIG. 3B is a diagram illustrating another representation of an example operation space of FIG. 3A according to aspects of the present disclosure.

Referring to FIG. 3A, according to certain embodiments, at the start of an operation, the entire domain 300 (the operation space) can be thought of as an empty matrix with only the X-axis and Y-axis defined. When a signal 102 is received, the system 200 may determine where that signal 102 falls within the X-Y space of the domain 300 and create a primary cell 104 in that location. Thus, the system 200 may store information corresponding to X and Y "grid markers" 302, 304, respectively, that divide the domain 300 into a primary grid and define the size and locations of the primary cells 104 that are to be created. FIG. 3B illustrates another representation corresponding to the example of FIG. 3A, showing the primary grid 100 overlaid on the domain 300. However, until a signal 102 is received within the location space corresponding a particular primary cell 104, the cell is not created. In the example of FIGS. 3A and 3B, where only a single signal 102 has been received by the system 200, this approach allows the entire domain 300 to be represented by a single active primary cell 104 instead of by a five by six (in the illustrated example) primary grid 100. It is to be appreciated that although FIGS. 3A and 3B illustrate an example of a five-by-six primary grid 100, in many applications, the primary grid 100 may represent thousands, tens of thousands, or even more, cells.

According to certain examples, a primary cell 104 only records the number of signals 102 that are received in that primary cell 104, along with the time of receipt of the most recently received signal 102. Recording timing information allows the system 200 to place a "shelf life" on each primary cell 104. For example, if no further signals 102 are detected within a given primary cell 104 within a certain time period measured from the time of receipt of the most recent signal 102 in that primary cell 104, the system 200 may discard or erase that primary cell 104 and its signal content. This approach allows the system 200 to remove "old" data that may no longer be relevant and thus free up computing resources, rather than maintaining primary cells that do not contain useful information.

As discussed above, the signals 102 may represent data vectors that contain information relating to two or more signal parameters within a given operation space or domain 300. Accordingly, the X and Y axes of the primary grid 100 may represent any of those signal parameters, which may depend on the domain 300 being monitored and/or on the application of the system 200. For example, in a radar application in which the signal receiver 208 is a radar receiver and the domain 300 represents the field of regard of the radar receiver, the X and Y axes may represent azimuth and elevation in the field of regard. In another example, one axis may represent range (i.e., how far the emitter is from the receiver 208) and the other axis may represent altitude of the emitter. In other applications, one axis may represent signal frequency, and the other axis may represent signal magnitude or phase, for example. In other examples, the X and Y axes may represent coordinate information, such as latitude and longitude of the signal source/emitter. It will be appreciated that there are numerous other examples, and the techniques and processes disclosed herein may operate on signals (data vectors) that represent any measured, detected, or determined signal parameters, depending on the application.

Figure 4:
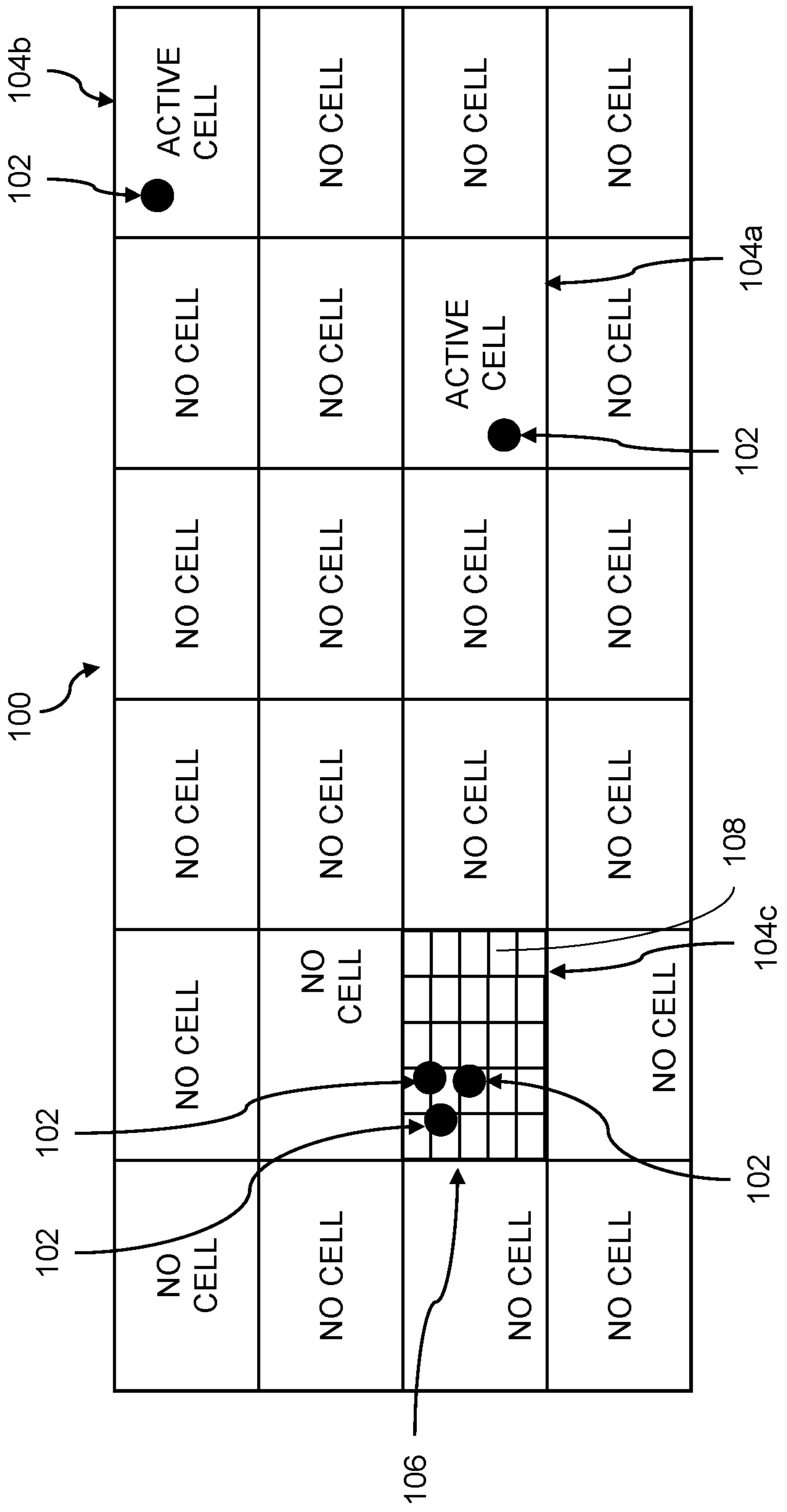
FIG. 4 is a diagram illustrating an example formation of primary and secondary grids within an operation space, in accordance with aspects of the present disclosure.

Referring to FIG. 4, after a certain signal density (e.g., number of received signals 102) threshold is met within a given active primary cell 104, a secondary grid 106 of secondary cells 108 may be created that maps to the active primary cell 104. In the example shown in FIG. 4, two primary cells 104*a*, 104 have not reached the signal density threshold for formation of the secondary grid 106; however, the primary cell 104*c* has. Thus, this primary cell 104*c* is represented by a secondary grid 106 of secondary cells 108 within it. In the illustrated example, the secondary grid 106 is a five-by-five grid of secondary cells 108; however, this example is illustrative only. Depending on the application and system configuration, the secondary grid 106 may include hundreds, thousands, tens of thousands, or more secondary cells 108. Further, as discussed above, in certain examples, the secondary grid may be a three-dimensional (X, Y, Z) grid, rather than a two-dimensional (X, Y) grid. As in the case of the primary grid 100, the axes of the secondary grid may represent any signal parameters of the received signals 102. In certain examples, the X and Y axes of the secondary grid 106 may represent the same signal parameters as the X and Y axes of the primary grid 100. In other examples, one or more of the axes of the secondary grid 106 may represent a different signal parameter than those represented by the axes of the primary grid 100.

According to certain examples, the signal density threshold for forming the secondary grid 106 may be a variable threshold. The signal density threshold may be adjusted to either increase or decrease the number of signals required to be received within a given a primary cell 104 during a specified time period in order for the system to proceed to form a secondary grid 106 within that primary cell. In certain examples, the signal density threshold may be application dependent. For example, in some applications, the threshold number of signals may be relatively few signals, such as 3, 6, 10, etc.; whereas in other applications, the threshold number of signals may be tens of signals, hundreds of signals, or more. In some examples, the threshold can be selected during a setup procedure of the system 200 at the start of a signal sorting operation. In other examples, the signal density threshold may be dynamically variable, e.g., by the signal sorting processor 204, to adjust to changing signal rate conditions in the operation space, for example. In other examples, the signal density threshold may be programmable by a user of the system 200.

In some examples, the secondary grid 106 may be created based on sparse grid principles, in a manner similar to formation of the primary grid 100. In other words, in some examples, once the signal density threshold for an active primary cell 104 has been met, the system 200 may begin to create secondary cells 108 based on reception of signals in the operation space corresponding to the active primary cell 104. Thus, the primary cell 104 may be represented by only those active secondary cells 108 (where one or more signals 102 have been detected), rather than by a complete N by M grid.

In some examples, a secondary cell 108 may reduce the information associated with a received signal 102. For example, similar to a primary cell 104, a secondary cell 108 may only record the number of signals 102 that are received in that secondary cell 108, along with the time of receipt of the most recently received signal 102. Again, the timing information may be used to ensure that the system 200 is storing and processing current data, rather than consuming resources by retaining information that may no longer be relevant. In other examples, a secondary cell 108 may store additional information about the received signals 102. Since the creation of a secondary cell 108 is based on a certain signal density existing in the operation space corresponding to that secondary cell, the very formation of the secondary cell 108 may indicate that the signals 102 collected in that secondary cell are more likely to be of interest, and therefore the use of some computing resources to store additional information corresponding to those signals 102 may be warranted.

Figure 5:
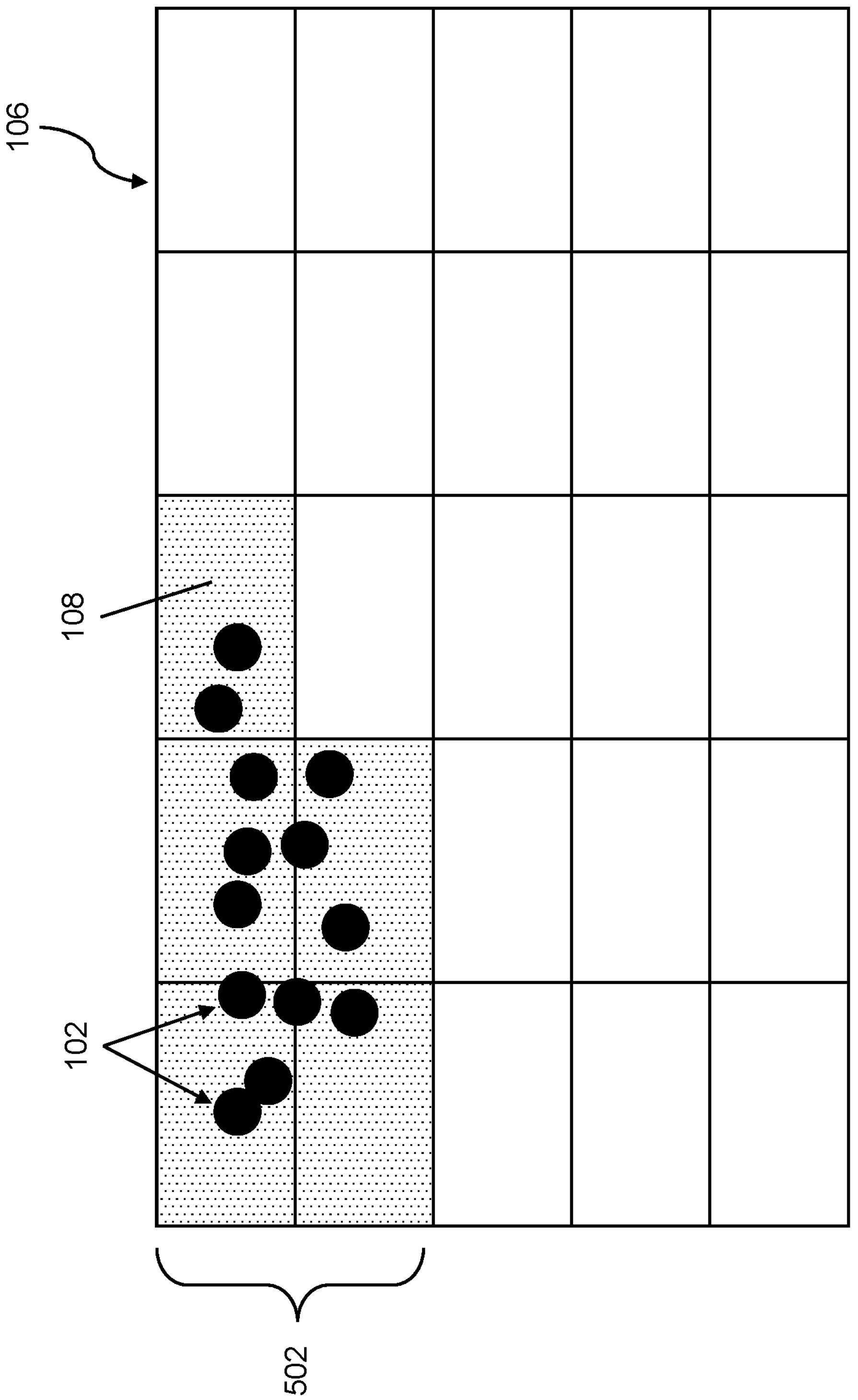
FIG. 5 is a diagram illustrating an example formation of a smart object within a secondary grid in accordance with aspects of the present disclosure.

Over time, within a single primary cell 104, a collection of one or more secondary cells 108 may begin to accumulate large numbers of signals 102. An example of this is illustrated in FIG. 5. If the signal density (i.e., number of signals 102 received) in a secondary cell 108 exceeds a predetermined threshold, a smart object 502 corresponding to that secondary cell may be created. Once created, that smart object 502 grows to encompass all connected/adjacent secondary cells 108 that contain signals 102. In the example illustrated in FIG. 5, the smart object 502 includes a collection of five adjacent active secondary cells 106 (shown shaded) in which a plurality of signals 102 have been collected. In some examples, once created, a smart object may expand to encompass all adjacent secondary cells 108 that contain one or more signals 102. In other examples; however, adjacent secondary cells 108 may be required to contain a certain minimum number of signals 102 to be included within the smart object.

According to certain examples, the smart object 502 does not know where it exists within the domain 300. Instead, the secondary cells 108 can be configured to flag incoming signals 102 as belonging to a specific smart object 502. Smart objects 502 may be highly configurable per user and/or application requirements. Smart objects 602 can be configured to store signal information, correlate data, and/or perform any operation needed on a per signal basis by the system 200. Once an incoming signal 102 has been associated with a smart object 502, it is deemed important enough to have additional processing performed on it. In this manner, the system 200 may efficiently handle very large numbers of signals 102 within a domain 300, by sorting and filtering the signals into primary and secondary cells 104, 108 with minimal processing, and reserving computationally "expensive" processing for the signals associated with smart objects.

Some complex signal sorting processes contain an inherent bias towards too few groups or too many. According to certain examples, to aid in total processing, embodiments of the methodology and processes disclosed herein may bias towards fewer groups (i.e., fewer smart objects 502). In some examples, the system 200 may implement two merge rules to determine whether or not to merge two smart objects 502 into a single smart object. The first merge rule considers whether the two smart objects in question share a common boundary. The second merge rule considers whether the two smart objects in question have been split before. According to one example, if two smart objects 502 share a boundary and have not been split before, the system 200 will merge the two smart objects to form a single new smart object. An example of this is illustrated in FIG. 6.

Figure 6:
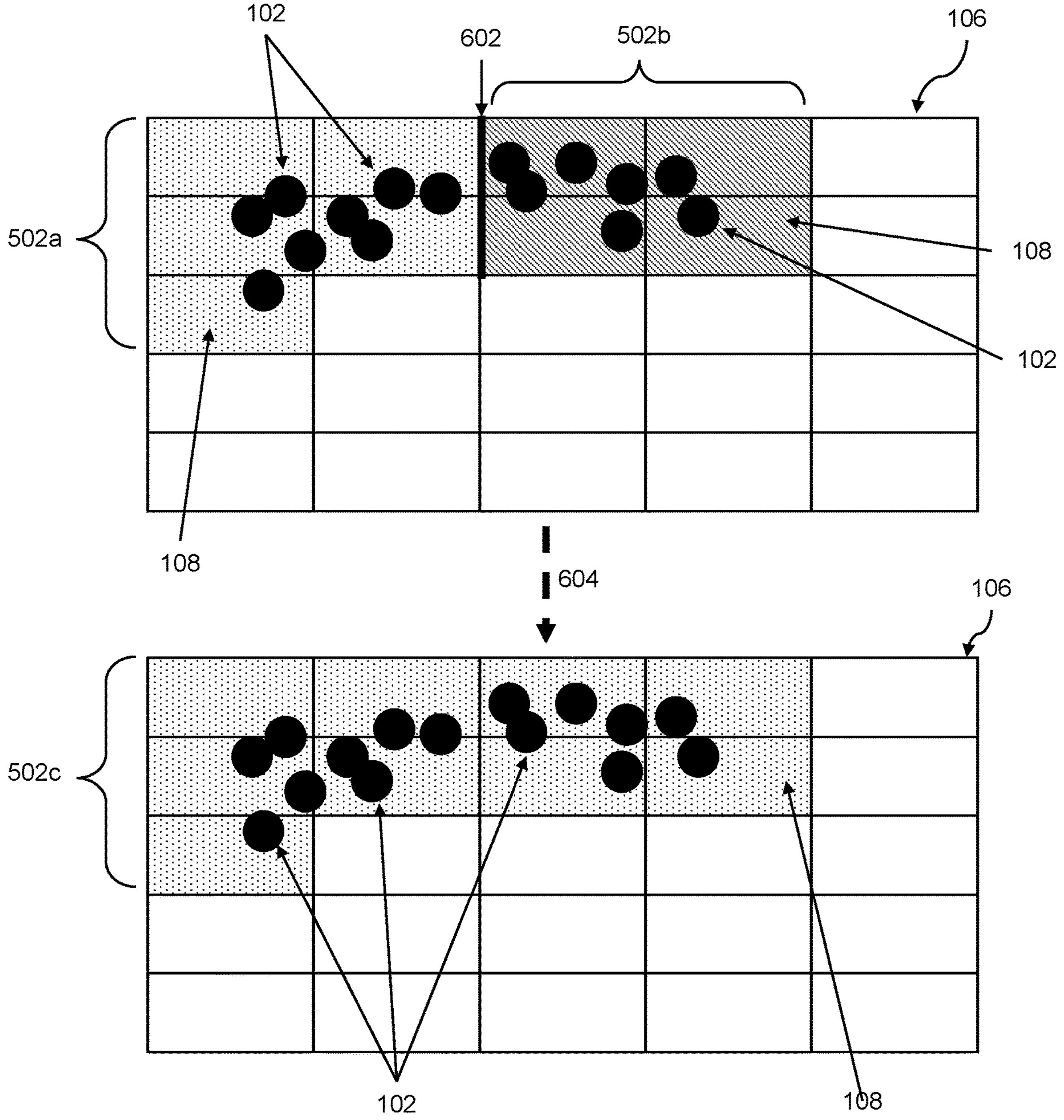
FIG. 6 is a diagram illustrating an example merging of smart objects in accordance with aspects of the present disclosure.

Referring to FIG. 6, in the illustrated example, the secondary grid 106 includes a first smart object 502*a* made up of five secondary cells 108 and a second smart object 502*b* made up of four secondary cells 108. Each of the two smart objects 502*a*, 502*b* includes a plurality of signals 102. The two smart objects 502*a*, 502*b*, share a boundary 602, as shown. Accordingly, the system 200 may make a decision to merge the two smart objects 502*a*, 502*b* (as indicated by arrow 604) to form a single new smart object 502*c*. In the example shown in FIG. 6, the boundary 602 is internal to the secondary grid 106. However, in other examples, a shared boundary between smart objects 502 may be a boundary between two adjacent secondary grids (i.e., between two primary cells 104). Thus, adjacent smart objects may be merged even if the two smart objects are not within the same primary cell 104.

According to certain examples, a merge may occur based on the two smart objects 502*a*, 502*b* sharing the boundary 602 and not having been split apart before, regardless of the number of signals 102 included in the smart objects 502*a*, 502*b* or the internal distribution of the signals 102 within either smart object 502*a*, 502*b*. Accordingly, the system 200 may be biased towards forming merges and a high number of merges may occur. Merging smart objects 502 may be beneficial in that reducing the number of individual smart objects 502 within a domain reduces the amount of processing to be performed by the system 200. By biasing towards merging, embodiments of the system 200 ensure there is always a minimum number of smart objects 502 that require individual processing. Accordingly, the computing resources required to perform signal processing in a domain 300 may be reduced, making the system 200 better equipped to handle domains 300 with high signal rates.

Figure 7:
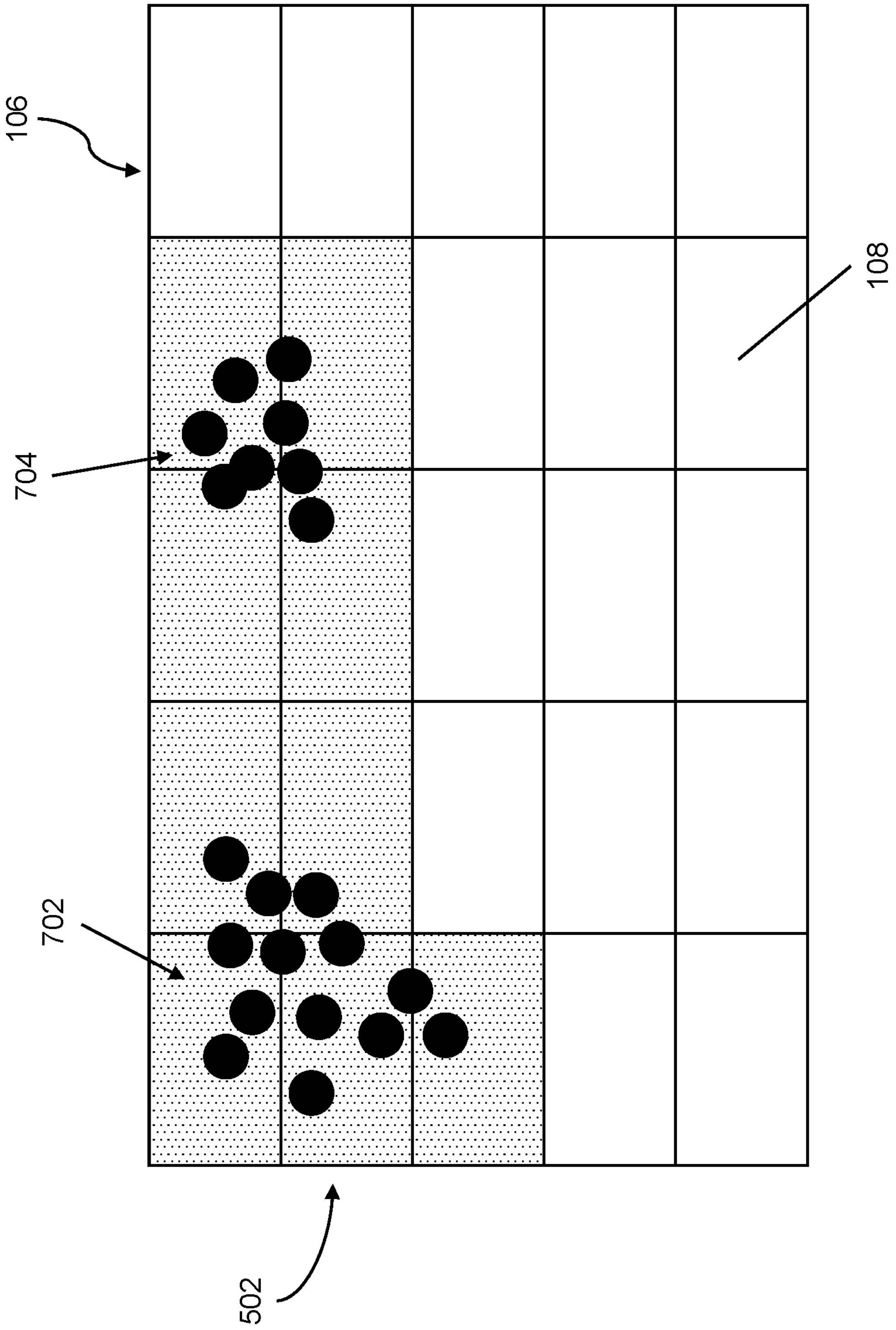
FIG. 7 is a diagram illustrating an example smart object containing two signal distributions in accordance with aspects of the present disclosure.

According to certain embodiments, to counter this hard bias towards merging, a splitting process may be implemented to provide for the ability to split a smart object 502. In certain instances, based on the manner in which secondary cells 108 filter signals 102 into smart objects 502, complex shapes can be created to define smart objects. In addition, in some instances, a smart object 502 may include two or more independent, or at least minimally connected, signal distributions. An example of this is illustrated in FIG. 7. As shown in FIG. 7, in this example, the smart object 502 (shaded cells) includes two separate signal distributions 702, 704. This situation may arise in various ways. For example, as discussed above, once the signal density within a secondary cell 108 exceeds a certain threshold, the secondary cell 108 is designated as a smart object 502, and in some examples, once created, a smart object 502 grows to encompass all adjacent secondary cells 108 that contain signals 102. Accordingly, in the process of adding secondary cells 108 to a smart object 502, the smart object 502 may end up containing two or more separate signal distributions 702, 704, as shown in FIG. 7. In other examples, when two smart objects 502 are merged, as discussed above, the resulting single smart object 502 may contain two or more independent distributions of signals 102. In such circumstances, for accurate signal processing, it may be beneficial to separate the smart object 502 into two (or more) smart objects, each containing one of the signal distributions. Accordingly, embodiments provide for a splitting process that divides a smart object 502 into two or more separate smart objects based on the signal distributions determined within the original smart object 502.

As discussed above, in some examples, the secondary cells 108 may not retain certain information associated with a signal 102. For example, when a signal 102 is received within a secondary cell 108 that is part of a smart object 502, the secondary cell 108 may tag the signal 102 as being associated with the smart object 502, but may not retain information that indicated the location of the signal 102 within the domain 300. Accordingly, unlike the merge process discussed above, in which shared boundaries between secondary cells 108 can be used to determine that two smart objects 502 should be merged, "positional" information (such as boundary locations) may not be available within a smart object 502. Thus, certain embodiments utilize data analysis techniques to appropriately split smart objects based on identifying two or more signal distributions within a smart object 502, as discussed further below.

According to certain embodiments, a splitting process includes determining whether it is likely that a given smart object 502 contains two or more separate signal distributions. To achieve this, in one example, a Chi-square "goodness of fit" test may be run on the dataset corresponding to the smart object 502. If a normal distribution is not detected, then a full split analysis may be run on the dataset. This is denoted in Equation (1) below. It will be appreciated that the case of two normal distributions in a single dataset (i.e., within a single smart object) will fail the Chi-square goodness of fit test.

$$X^2 = \Sigma\left(\frac{(\text{observed} - \text{expected})^2}{\text{expected}}\right) \tag{1}$$

In some examples, if the dataset fails the Chi-square goodness of fit test, the dataset may be run through a maximum likelihood estimator as denoted in Equation 2. In one example, the initial defaults for both means and variances (of the estimated two signal distributions within the dataset) are the mean and variance of the total dataset. Equation 3 denotes an example of which parameters are tuned during the estimation. In this case, x[n] represents the true signal values in one dimension. Equation 2 operates on one dimension at a time; therefore, the signal splitting process may include repeating the analysis to apply Equations (2) and (3) to the dataset for all valid dimensions. This is due to the explosive nature in computation that may be required as more dimensions are added.

$$p(x[n];\theta) = \frac{p_1}{\sqrt{2\pi\sigma_1^2}} e^{-\frac{1}{2}\left(\frac{x[n]-\mu_1}{\sigma_1}\right)^2} + \frac{1-p_1}{\sqrt{2\pi\sigma_2^2}} e^{-\frac{1}{2}\left(\frac{x[n]-\mu_2}{\sigma_2}\right)^2} \tag{2}$$

$$\theta = \{p_1, \mu_1, \sigma_1, \mu_2, \sigma_2\} \tag{3}$$

According to certain examples, once the signal distributions are characterized using the above equations, the divergence between the distributions is calculated using the Kullback-Leibler divergence (KLD) equations denoted in Equations 4 and 5 below. The equation is not symmetrical; therefore it can be run twice, and the minimum value taken as the actual divergence. In Equations (4) and (5) below, n is the number of dimensions in the vectors. In this case, n is equal to two as all variables represent distributions in two dimensions.

$$KLD_1 = \frac{1}{2}(\mu_2-\mu_1)^T\Sigma_2^{-1}(\mu_2-\mu_1) + tr(\Sigma_2^{-1}\Sigma_1) - \ln\frac{|\Sigma_1|}{|\Sigma_2|} - n \tag{4}$$

$$KLD_2 = \frac{1}{2}(\mu_1-\mu_2)^T\Sigma_1^{-1}(\mu_1-\mu_2) + tr(\Sigma_1^{-1}\Sigma_2) - \ln\frac{|\Sigma_2|}{|\Sigma_1|} - n \tag{5}$$

If the minimum KLD value is above a predetermined threshold, a split may be triggered. In some examples, the split is accomplished by taking every secondary cell 108 that occupies the current smart object 502 and evaluating, using Equation (6) below, which distribution that cell has the highest likelihood of being a member of. Once that is determined, the secondary cell is provided the new smart object identifier.

$$p(x, y) = \frac{1}{\sqrt{2\pi\sigma_x^2}} e^{-\frac{1}{2}\left(\frac{x-\mu_x}{\sigma_x}\right)^2} \frac{1}{\sqrt{2\pi\sigma_y^2}} e^{-\frac{1}{2}\left(\frac{y-\mu_y}{\sigma_y}\right)^2} \tag{6}$$

According to certain embodiments, once a smart object 502 has been split into two new smart objects, those new smart objects may be provided with identifiers (or other tags) that indicate that they no longer follow the merge rules and process discussed above. As noted above, one factor considered in the merge process is whether or not the smart objects being considered for merging have been split before. If they have, instead of following the merge process discussed above, the two smart objects may be re-run through the split function discussed above to confirm that their signal distributions are truly separate. If, at any point, the two smart objects fail to split, they may be merged back together.

Example MATLAB Code for Smart Object Splitting Function

The following is an example of MATLAB code that can be used to implement the above-discussed smart object splitting process in accordance with an example of the present disclosure.

```
function [detect, mu1,sigma1,mu2,sigma2] = findDistributions(d,alpha)
%       Finds if the distributions is non-normal and if so, whether there are two
%       normal distributions within one set of data.
```

-continued

```
        detect = chi2gof(d);
        if detect ==1
          pdf_normmixture = @(d,p,mu1,mu2,sigma1,sigma2)...
            p*normpdf(d,mu1,sigma1)+(1−p)*normpdf(d,mu2,sigma2);
          pStart = 0.5;
          muStart = quantile(d,[0.25 0.75]);
          sigmaStart = sqrt(var(d)−0.25*diff(muStart).^2);
          start = [pStart muStart sigmaStart sigmaStart];
          lb = [0 −Inf −Inf 0 0];
          ub = [1 Inf Inf Inf Inf];
          Options = statset;
          Options.MaxIter = 1000;
          Options.MaxFunEvals = 2000;
          paramEst = mle(d,'pdf',pdf_normmixture,'start',start,...
            'LowerBound',lb,'UpperBound',ub,'Alpha',alpha,'Options',Options);
          mu1 = paramEst(2);
          mu2 = paramEst(3);
          sigma1 = paramEst(4);
          sigma2 = paramEst(5);
        else
          mu1 = mean(d);
          sigma1 = sqrt(var(d));
          mu2 = mu1;
          sigma2 = sigma1;
        end
end
```

Figure 8A:
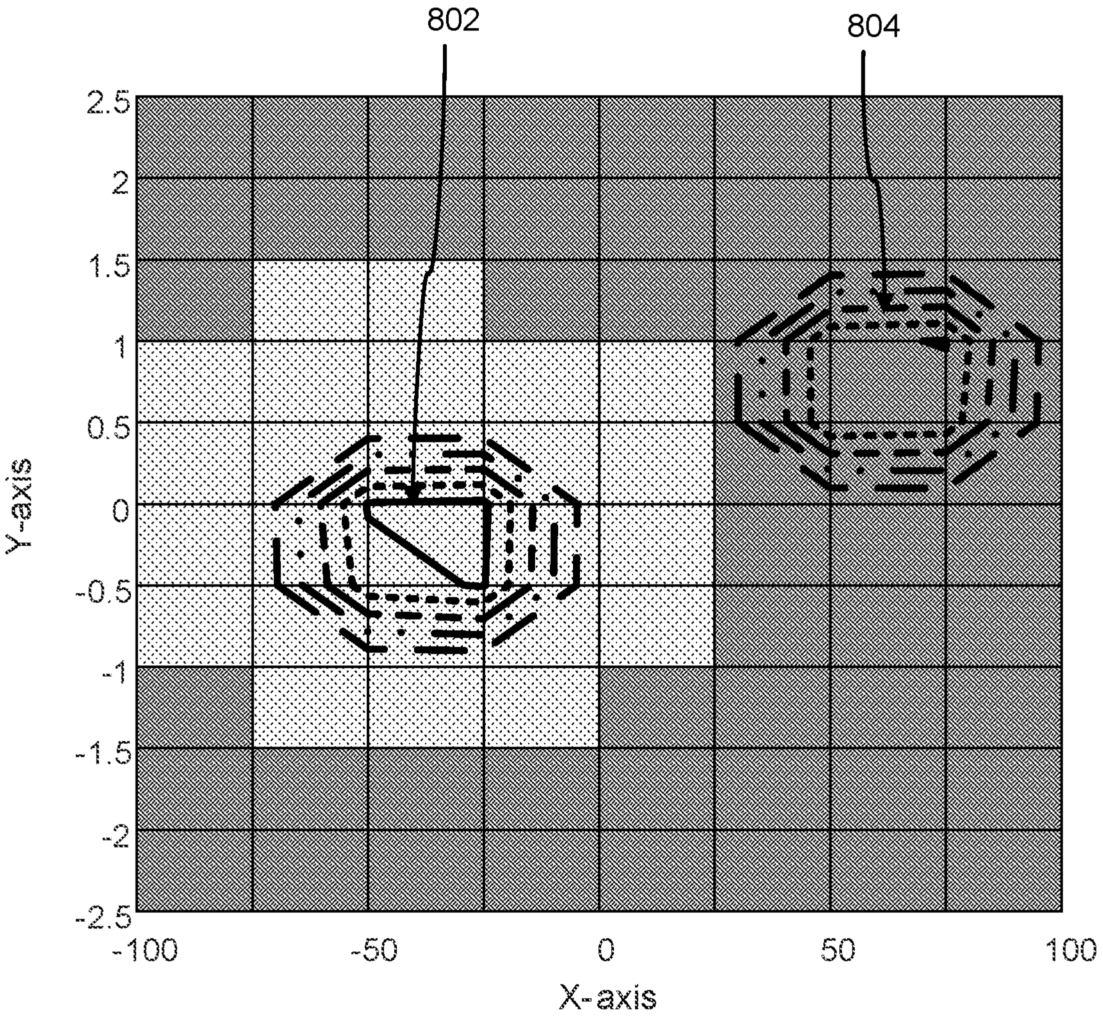
FIG. 8A is a diagram illustrating two example signal distributions within a smart object, according to aspects of the present disclosure.
Figure 8B:
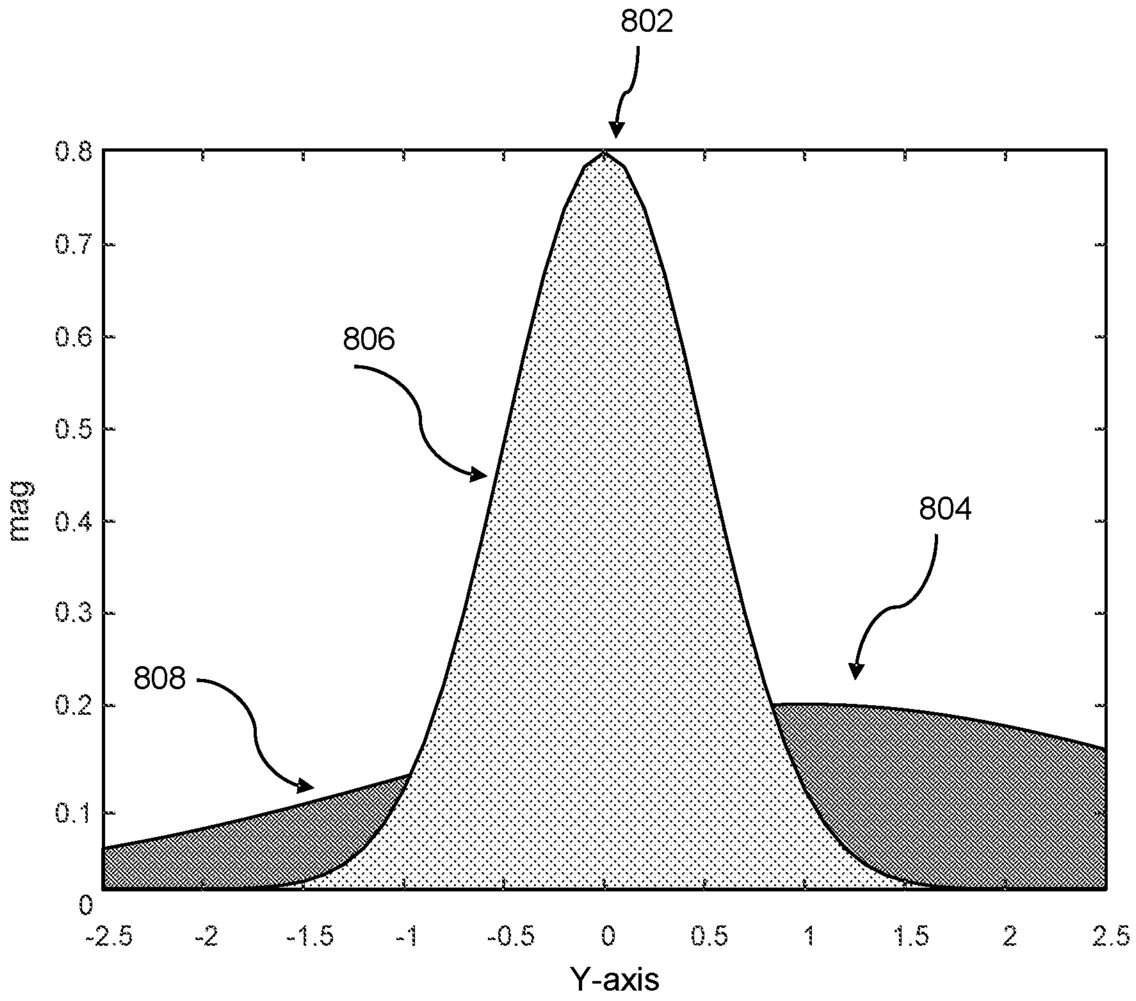
FIG. 8B is a graph illustrating the two example signal distributions corresponding to FIG. 8A, in accordance with aspects of the present disclosure.

FIGS. 8A and 8B illustrate an example of a dataset corresponding to a smart object 502 including two separate signal distributions, such as shown in FIG. 7, for example. FIG. 8A illustrates an example of the result of applying the splitting function corresponding to the above MATLAB code to the dataset. In FIG. 8A, the contour lines show where the signals within the dataset are located. As illustrated, the splitting function reveals that the dataset includes two peaks, 802, 804. FIG. 8A demonstrates a benefit of having individual secondary cells 108 filter into smart objects 502, as discussed above. The shading in FIG. 8A indicates how individual secondary cells may be allocated between two separate smart objects according to the splitting function discussed above. Applying Equation (6), the split function may write to individual secondary cells 108 to associate the signals 102 within that cell with the appropriate smart object.

FIG. 8B illustrates the corresponding two normal distributions, 806, 808. In FIG. 8B, the x-axis (horizontal axis) is the same as the x-axis in FIG. 8A, and the vertical axis represents normalized signal magnitude. FIG. 8B may allow a benefit of the splitting function discussed above to be visualized. In this case, merely considering the distance between any given data point and the signal distribution mean may not be adequate to correctly associate a given signal with the appropriate distribution and thus the correct new smart object. For example, as shown in FIG. 8B, at position $x=-1.5$, the probability that a signal belongs to the distribution 808 is greater than the probability that it belongs to the distribution 806, despite being closer to the mean of the distribution 806. However, applying the splitting function represented by the MATLAB code given above allows the signals to be correctly allocated. The manner of associating secondary cells 108 with smart objects according to examples of the signal sorting processes disclosed herein allows for significantly more signal distributions to be present without needing to re-compute with every new signal 102.

Example Signal Sorting Methodologies

Figure 9:
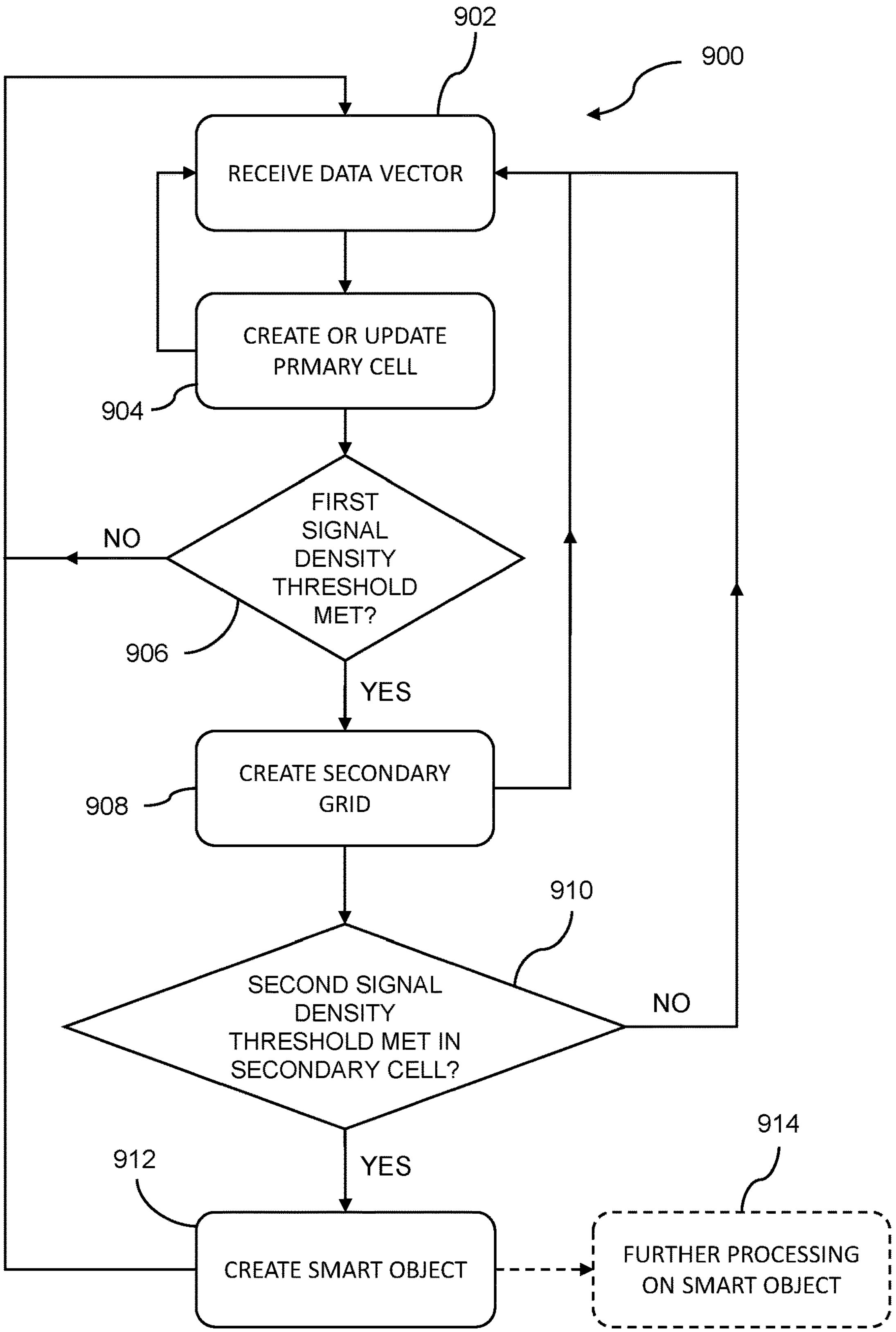
FIG. 9 is a flow diagram of an example methodology for sorting signals, in accordance with aspects of the present disclosure.

FIG. 9 is a flow diagram of an example methodology 900 for sorting and evaluating signals, in accordance with aspects of the present disclosure. The methodology 900 can be implemented, for example, in the system 200 of FIG. 2. The methodology 900 includes receiving (at 902) a plurality of data vectors representing a plurality of signals 102. For example, each of the vectors can represent signal parameters in a time domain. At 904, the methodology 900 further includes creating or updating, for each of the data vectors, a primary cell 104 within a primary grid 100 covering the operation space in which the signals 102 are received. As discussed above, when a first signal 102 is received in a region of the domain 300, the primary cell 104 is created at that region and the first signal is associated with that primary cell. Further signals 102 can be added to that primary cell 104 (updating the cell). The methodology 900 further includes determining (decision block 906) whether the number of signals associated with a given primary cell 104 has exceeded a first predetermined threshold. If the signal density (number of signals 102) exceeds the first threshold, a secondary grid 106 can be created within that primary cell 104 (at 908), as discussed above. As shown in FIG. 9, the system continues to receive signals 102. As signals 102 are received within the primary cell in which the secondary grid 106 has been created, secondary cells 108 are created in the regions of the primary cell 104 where those signals are received, and the signals 102 are associated with those secondary cells 108. Thus, secondary cells 108 are created in the same manner as are primary cells 104. The methodology 900 further includes determining (decision block 910) whether the number of signals 102 associated with (received in) a given secondary cell 108 has exceeded a second predetermined threshold. If the signal density (number of signals 102) in the secondary cell 108 exceeds the second threshold, a smart object 502 is created (at 912) that corresponds to at least that secondary cell. As discussed above, creating the smart object 502 may include adding adjacent secondary cells 108 that contain signals 102, whether or not those secondary cells have met the second signal density threshold. Once signals 102 are associated with a smart object, any of numerous signal processing techniques or functions may be applied, as discussed above. At 914 of this example, the methodology 900 includes applying further signal processing to the smart object(s) 502. In other examples, the system 200 may export the datasets corresponding to the smart objects to one or more external computing platforms for further processing.

Figure 10:
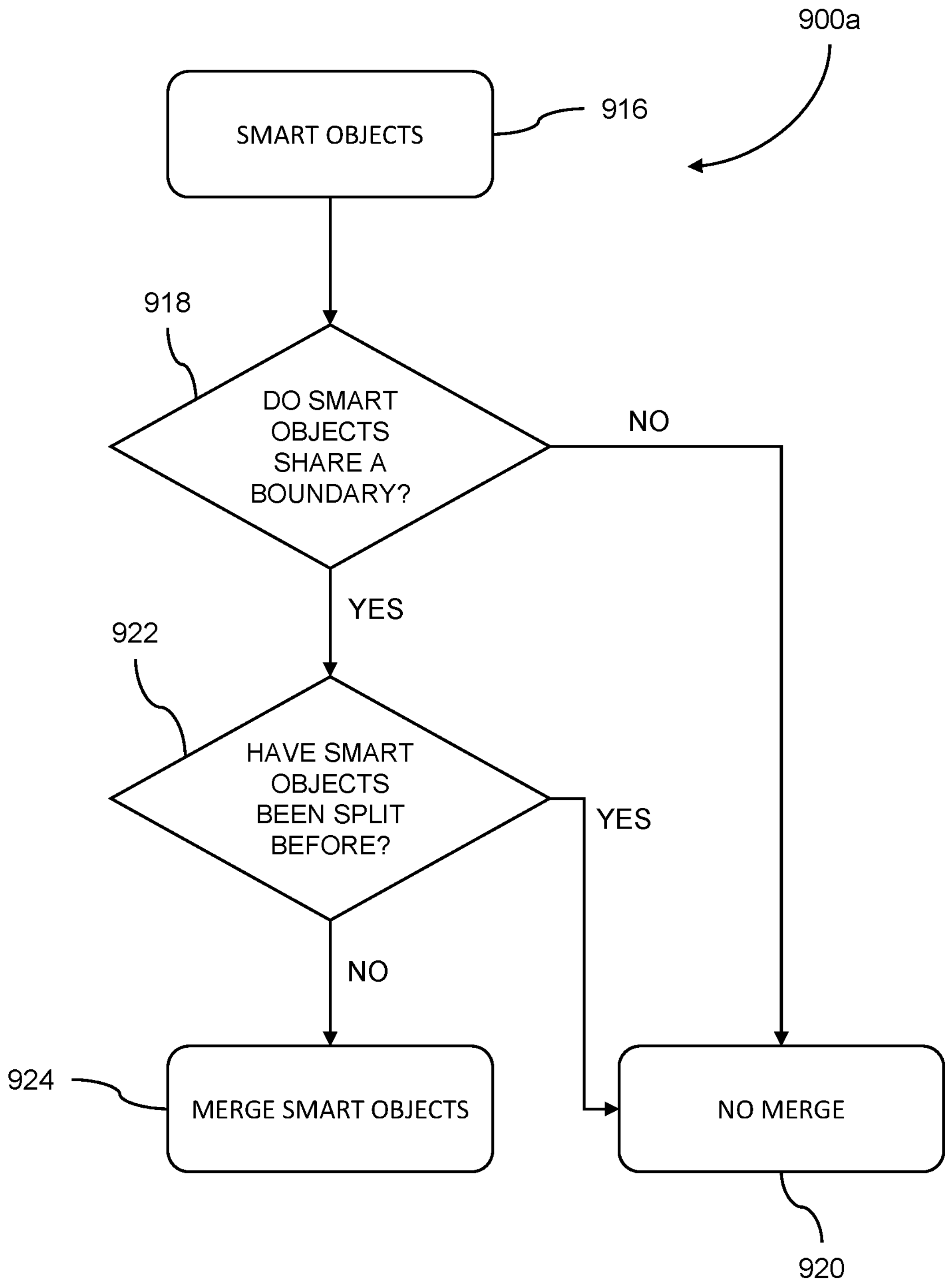
FIG. 10 is a flow diagram of an example smart object merging process forming part of the methodology of FIG. 9, in accordance with aspects of the present disclosure.

FIG. 10 is a flow diagram corresponding to a further aspect of the methodology 900, specifically, an example of a process 900*a* for merging smart objects. The merge process 900*a* starts with two smart objects (block 916). As discussed above, in one example, the merge process includes determining whether the two smart objects share a common boundary (decision block 918). If there is no shared boundary, the smart objects are not merged (block 920). If the smart objects do share at least one common boundary, the process 900*a* may include determining whether or not those two smart objects have been formed by previously splitting another smart object into two (decision block 922). As discussed above, if the two smart objects are a result of a previous split, the merging process 900*a* may not be applied; instead, the smart objects may be evaluated according to the splitting function discussed above. If the two smart objects have not been split before, the process 900*a* may include merging the two smart objects to form a single, new smart object (at 924).

Figure 11:
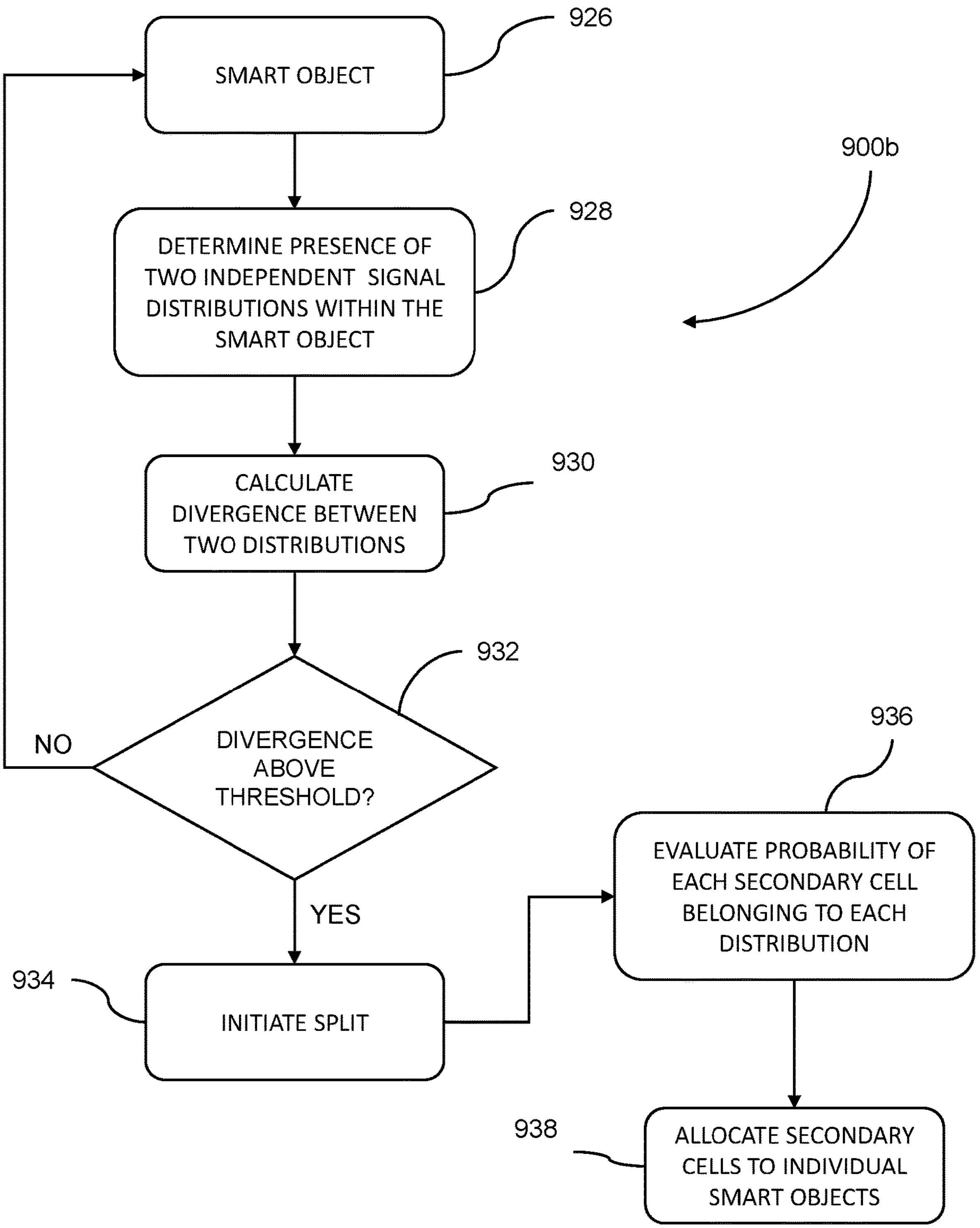
FIG. 11 is a flow diagram of an example of a smart object splitting process forming part of the methodology of FIG. 9, in accordance with aspects of the present disclosure.

FIG. 11 is a flow diagram corresponding to a further aspect of the methodology 900, specifically, an example of a process 900*b* for splitting smart objects. The process 900*b* begins with a smart object (block 926). At 928, the process 900*b* includes determining that two or more separate signal distributions exist within the smart object 502. As discussed above, in one such example, 928 may include performing a Chi-square goodness of fit test on the dataset corresponding to the smart object. If two (or more) distributions are detected at 928, the process 900*b* may include calculating the divergence between the two (or more) signal distributions (at 930) to determine whether or not they are independent. If the divergence is above a certain threshold (decision block 932), a split may be initiated (at 934). To perform the split, the process 900*b* may include, at 936, evaluating, for each secondary cell included within the smart object, the probability or likelihood that the cell belongs to one or another of the signal distributions identified at 928. Based on this determination, each secondary cell may be assigned an identifier or tag that associates it with one of the new, split, smart objects (at 938).

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 provides a method of sorting signals. The method includes receiving, via a signal receiver, a plurality of data vectors representing a plurality of signals, establishing a sparse primary grid over an operation space of the signal receiver, the sparse primary grid including at least one primary cell in which at least one data vector of the plurality of data vectors has been received, based on a first number of data vectors received within the primary cell exceeding a first threshold value, establishing a sparse secondary grid within the primary cell, the sparse secondary grid including at least one secondary cell in which one or more data vectors of the at least one data vector have been received, based on a second number of data vectors received within the at least one secondary cell exceeding a second threshold value, establishing a first smart object corresponding to the at least one secondary cell, and associating the one or more data vectors received within the at least one secondary cell with the first smart object.

Example 2 includes the method of Example 1, wherein establishing the sparse primary grid includes establishing the sparse primary grid having first and second orthogonal primary axes corresponding, respectively, to first and second parameters of the plurality of data vectors, and wherein establishing the sparse secondary grid includes establishing the sparse secondary grid having first and second orthogonal secondary axes corresponding, respectively, to the first and second parameters of the plurality of data vectors.

Example 3 includes the method of Example 2, wherein establishing the secondary grid includes establishing the secondary grid having a third orthogonal secondary axis corresponding to a third parameter of the plurality of data vectors.

Example 4 includes the method of any one of Examples 1-3, wherein establishing the first smart object includes associating any secondary cells disposed adjacent to the at least secondary cell and having collected at least one data vector of the plurality of data vectors with the first object.

Example 5 includes the method of any one of Examples 1-4, wherein the at least one primary cell records the first number of data vectors received within the at least one primary cell and a time of receipt of a most recently received data vector within the at least one primary cell.

Example 6 includes the method of Example 5, further including deleting the at least one primary cell based on an amount of time, measured since the time of receipt and during which no further data vectors are received within the at least one primary cell, exceeding a predetermined threshold.

Example 7 includes the method of any one of Examples 1-6, further including establishing a second smart object based on a third number of data vectors received within an additional secondary cell exceeding the second threshold value.

Example 8 includes the method of Example 7, further including determining that the first and second smart objects share a common boundary, determining that the first and second smart objects were not previously merged, and merging the first and second smart objects to form a single third smart object.

Example 9 includes the method of any one of Examples 1-8, further including determining that the first smart object contains two or more distributions of data vectors, determining a divergence between the two or more distributions of data vectors, and based on the divergence exceeding a predetermined threshold, splitting the first smart object into multiple smart objects, each smart object of the multiple smart objects being associated with one of the two or more distributions.

Example 10 includes the method of Example 9, wherein splitting the first smart object into multiple smart objects includes evaluating, for each secondary cell associated with the first smart object, probabilities that the secondary cell corresponds to each of the two or more distributions, and based on the probabilities, assigning each secondary cell to one of the two or more distributions.

Example 11 includes the method of one of Examples 9 and 10, wherein determining that the first smart object contains two more distributions of data vectors includes forming a Chi-square goodness of fit test on a dataset corresponding to the first smart object, the data set including the one or more data vectors associated with the first smart object.

Example 12 provides a computer readable medium encoded with instructions that, when executed by at least one processor, cause the at least one processor to execute the method of any one of Examples 1-11.

Example 13 provides a signal sorting system comprising at least one signal receiver configured to receive a plurality of signals, a data storage, and at least one processor coupled to the data storage and configured to execute a process comprising receiving, via the at least one signal receiver, a plurality of data vectors representing the plurality of signals, establishing a sparse primary grid over an operation space of the signal receiver, the sparse primary grid including at least one primary cell in which at least one data vector of the plurality of data vectors has been received, based on a first number of data vectors received within the primary cell exceeding a first threshold value, establishing a sparse secondary grid within the primary cell, the sparse secondary grid including at least one secondary cell in which one or more data vectors of the at least one data vector have been received, based on a second number of data vectors received within the at least one secondary cell exceeding a second threshold value, establishing a first smart object corresponding to the at least one secondary cell, and associating the one or more data vectors received within the at least one secondary cell with the first smart object.

Example 14 includes the signal sorting system of Example 13, wherein the sparse primary grid has first and second orthogonal primary axes corresponding, respectively, to first and second parameters of the plurality of data vectors, and wherein the sparse secondary grid has first and second orthogonal secondary axes, the first and second secondary axes corresponding, respectively, to the first and second parameters of the plurality of data vectors.

Example 15 includes the signal sorting system of Example 14, wherein the sparse secondary grid further has a third orthogonal secondary axis corresponding to a third parameter of the plurality of data vectors.

Example 16 includes the signal sorting system of any one of Examples 13-15, wherein establishing the first smart object includes associating any secondary cells disposed adjacent to the at least secondary cell and having collected at least one data vector of the plurality of data vectors with the first object.

Example 17 includes the signal sorting system of any one of Examples 13-16, wherein the at least one processor is configured to store, in the data storage, information corresponding to the at least one primary cell, the information including the first number of data vectors received within the at least one primary cell and a time of receipt of a most recently received data vector within the at least one primary cell.

Example 18 includes the signal sorting system of Example 17, wherein the at least one processor is further configured to delete from the data storage the information corresponding to the at least one primary cell based on an amount of time, measured since the time of receipt and during which no further data vectors are received within the at least one primary cell, exceeding a predetermined threshold.

Example 19 includes the signal sorting system of any one of Examples 13-18, wherein the process further comprises establishing a second smart object based on a third number of data vectors received within an additional secondary cell exceeding the second threshold value.

Example 20 includes the signal sorting system of Example 19, wherein the process further comprises determining that the first and second smart objects share a common boundary, determining that the first and second smart objects were not previously merged, and merging the first and second smart objects to form a single third smart object.

Example 21 includes the signal sorting system of any one of Examples 13-20, wherein the process further comprises determining that the first smart object contains two or more distributions of data vectors, determining a divergence between the two or more distributions of data vectors, and based on the divergence exceeding a predetermined threshold, splitting the first smart object into multiple smart objects, each smart object of the multiple smart objects being associated with one of the two or more distributions.

Example 22 includes the signal sorting system of Example 21, wherein splitting the first smart object into multiple smart objects includes evaluating, for each secondary cell associated with the first smart object, probabilities that the secondary cell corresponds to each of the two or more distributions, and based on the probabilities, assigning each secondary cell to one of the two or more distributions.

Example 23 includes the signal sorting system of one of Examples 21 and 22, wherein determining that the first smart object contains two more distributions of data vectors includes forming a Chi-square goodness of fit test on a dataset corresponding to the first smart object, the data set including the one or more data vectors associated with the first smart object.

Example 24 provides a computer program product including one or more non-transitory machine-readable mediums encoded with instructions that when executed by one or more processors cause a process to be carried out for evaluating signals. The process includes receiving, via a signal receiver, a plurality of data vectors representing a plurality of signals, establishing a sparse primary grid over an operation space of the signal receiver, the sparse primary grid including at least one primary cell in which at least one data vector of the plurality of data vectors has been received, based on a first number of data vectors received within the primary cell exceeding a first threshold value, establishing a sparse secondary grid within the primary cell, the sparse secondary grid including at least one secondary cell in which one or more data vectors of the at least one data vector have been received, based on a second number of data vectors received within the at least one secondary cell exceeding a second threshold value, establishing a first smart object corresponding to the at least one secondary cell, and associating the one or more data vectors received within the at least one secondary cell with the first smart object.

Example 25 includes the computer program product of Example 24, wherein the process includes the features of any one of Examples 2-11.

Example 26 includes the computer program product of Example 24, wherein establishing the sparse primary grid includes establishing the sparse primary grid having first and second orthogonal primary axes corresponding, respectively, to first and second parameters of the plurality of data vectors, and wherein establishing the sparse secondary grid includes establishing the sparse secondary grid having first and second orthogonal secondary axes corresponding, respectively, to the first and second parameters of the plurality of data vectors.

Example 27 includes the computer program product of Example 26, wherein establishing the secondary grid includes establishing the secondary grid having a third orthogonal secondary axis corresponding to a third parameter of the plurality of data vectors.

Example 28 includes the computer program product of Example 24, wherein establishing the first smart object includes associating any secondary cells disposed adjacent to the at least secondary cell and having collected at least one data vector of the plurality of data vectors with the first object.

Example 29 includes the computer program product of Example 24, wherein the at least one primary cell records the first number of data vectors received within the at least one primary cell and a time of receipt of a most recently received data vector within the at least one primary cell.

Example 30 includes the computer program product of Example 29, wherein the process further comprises deleting the at least one primary cell based on an amount of time, measured since the time of receipt and during which no further data vectors are received within the at least one primary cell, exceeding a predetermined threshold.

Example 31 includes the computer program product of Example 24, wherein the process further comprises establishing a second smart object based on a third number of data vectors received within an additional secondary cell exceeding the second threshold value.

Example 32 includes the computer program product of Example 31, wherein the process further comprises determining that the first and second smart objects share a common boundary, determining that the first and second smart objects were not previously merged, and merging the first and second smart objects to form a single third smart object.

Example 33 includes the computer program product of Example 24, wherein the process further comprises determining that the first smart object contains two or more distributions of data vectors, determining a divergence between the two or more distributions of data vector, and based on the divergence exceeding a predetermined threshold, splitting the first smart object into multiple smart objects, each smart object of the multiple smart objects being associated with one of the two or more distributions.

Example 34 includes the computer program product of Example 33, wherein splitting the first smart object into multiple smart objects includes evaluating, for each secondary cell associated with the first smart object, probabilities that the secondary cell corresponds to each of the two or more distributions, and based on the probabilities, assigning each secondary cell to one of the two or more distributions.

Example 35 includes the computer program product of Example 33, wherein determining that the first smart object contains two more distributions of data vectors includes forming a Chi-square goodness of fit test on a dataset corresponding to the first smart object, the data set including the one or more data vectors associated with the first smart object.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments the system 200 may include additional, fewer, or alternative subcomponents as compared to those included in the example embodiment of FIG. 2.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate-level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some examples may be implemented, for example, using a machine-readable medium or article which may store an instruction or a set of instructions that, if executed by a machine, may cause the machine to perform a method and/or operations in accordance with an embodiment provided herein. Such a machine may include, for example, any suitable processing platform, computing platform, computing device, processing device, computing system, processing system, computer, process, or the like, and may be implemented using any suitable combination of hardware and/or software. The machine-readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A computer program product including one or more non-transitory machine-readable mediums encoded with instructions that when executed by one or more processors cause a process to be carried out for sorting radar signals, the process comprising:

receiving, via a radar signal receiver, a plurality of radar signals from one or more signal sources or emitters within a field of regard of the radar signal receiver, the radar signal receiver being configured to convert the plurality of radar signals into a plurality of data vectors representing the plurality of radar signals, each of the plurality of data vectors comprising measured radar-signal parameters including a first radar signal parameter and a second radar signal parameter of a corresponding radar signal within the field of regard and a third radar signal parameter associated with the corresponding radar signal;

establishing a sparse primary grid over the field of regard of the radar signal receiver, the sparse primary grid including at least one primary cell in which at least one data vector of the plurality of data vectors has been received;

based on a first number of data vectors received within the primary cell exceeding a first threshold value, establishing a sparse secondary grid within the primary cell, the sparse secondary grid including at least one secondary cell in which one or more data vectors of the plurality of data vectors have been received;

based on a second number of data vectors received within the at least one secondary cell exceeding a second threshold value, establishing a first smart object corresponding to the at least one secondary cell, the first smart object representing one or more radar signals represented by the one or more data vectors received within the at least one secondary cell, wherein the one or more data vectors include respective a first radar signal parameter value and respective a second radar signal parameter value corresponding to the first and second secondary axes of the sparse secondary grid;

associating the one or more data vectors received within the at least one secondary cell with the first smart object;

applying a radar signal processing operation to the one or more data vectors associated with the first smart object instead of applying the radar signal processing operation to every data vector of the plurality of data vectors; and providing the first smart object to the one or more processors for further radar signal processing;

wherein establishing the sparse primary grid includes establishing the sparse primary grid having first and second orthogonal primary axes corresponding, respectively, to the first radar signal parameter value and the second radar signal parameter value of the plurality of data vectors; and wherein establishing the sparse secondary grid includes establishing the sparse secondary grid having first, second, and third orthogonal secondary axes, the first and second secondary axes corresponding, respectively, to the first radar signal parameter value and the second radar signal parameter value of the plurality of data vectors, and the third secondary axis corresponding to the third radar signal parameter of the plurality of data vectors.

2. The computer program product of claim 1, wherein establishing the first smart object includes associating any secondary cells disposed adjacent to the at least secondary cell and having collected at least one data vector of the plurality of data vectors with the first smart object.

3. The computer program product of claim 1, wherein the at least one primary cell records the first number of data vectors received within the at least one primary cell and a time of receipt of a most recently received data vector within the at least one primary cell.

4. The computer program product of claim 3, wherein the process further comprises deleting the at least one primary cell based on an amount of time, measured since the time of receipt and during which no further data vectors are received within the at least one primary cell, exceeding a predetermined threshold.

5. The computer program product of claim 1, wherein the process further comprises:

establishing a second smart object based on a third number of data vectors received within an additional secondary cell exceeding the second threshold value;

determining that the first and second smart objects share a common boundary;

determining that the first and second smart objects were not previously merged; and merging the first and second smart objects to form a single third smart object.

6. The computer program product of claim 1, wherein the process further comprises:

determining that the first smart object contains two or more distributions of data vectors;

determining a divergence between the two or more distributions of data vectors; and based on the divergence exceeding a predetermined threshold, splitting the first smart object into multiple smart objects, each smart object of the multiple smart objects being associated with one of the two or more distributions.

7. The computer program product of claim 6, wherein splitting the first smart object into multiple smart objects includes:

evaluating, for each secondary cell associated with the first smart object, probabilities that the secondary cell corresponds to each of the two or more distributions; and based on the probabilities, assigning each secondary cell associated with the first smart object to one of the two or more distributions.

8. The computer program product of claim 6, wherein determining that the first smart object contains two more distributions of data vectors includes forming a Chi-square goodness of fit test on a dataset corresponding to the first smart object, the dataset including the one or more data vectors associated with the first smart object.

9. A signal sorting system comprising:

at least one radar signal receivers configured to receive a plurality of radar signals from one or more signal sources or emitters within a field of regard of the at least one radar signal receiver, the at least one radar signal receiver configured to convert the plurality of radar signals into a plurality of data vectors, each of the plurality of data vectors comprising measured radar-signal parameters including a first radar signal parameter and a second radar signal parameter of a corresponding radar signal within the field of regard and a third radar signal parameter associated with the corresponding radar signal;

a data storage; and at least one processor coupled to the data storage and configured to execute a process comprising:

receiving, via the at least one radar signal receiver, the plurality of data vectors representing the plurality of radar signals;

establishing a sparse primary grid over the field of regard of the at least one radar signal receiver, the sparse primary grid including at least one primary cell in which at least one data vector of the plurality of data vectors has been received;

based on a first number of data vectors received within the primary cell exceeding a first threshold value, establishing a sparse secondary grid within the primary cell, the sparse secondary grid including at least one secondary cell in which one or more data vectors of the plurality of data vectors have been received;

based on a second number of data vectors received within the at least one secondary cell exceeding a second threshold value, establishing a first smart object corresponding to the at least one secondary cell, the first smart object identifying one or more radar signals represented by the one or more data vectors received within the at least one secondary cell; and associating the one or more data vectors received within the at least one secondary cell with the first smart object;

wherein the at least one processor is further configured to apply a radar signal processing operation to the one or more data vectors associated with the first smart object instead of applying the radar signal processing operation to every data vector of the plurality of data vectors, and to provide the first smart object for further radar signal processing;

wherein the sparse primary grid has first and second orthogonal primary axes corresponding, respectively, to first and second parameters of the plurality of data vectors; and wherein the sparse secondary grid has first, second, and third orthogonal secondary axes, the first and second secondary axes corresponding, respectively, to the first radar signal parameter and the second radar signal parameter of the plurality of data vectors, and the third secondary axis corresponding to the third radar signal parameter of the plurality of data vectors.

10. The signal sorting system of claim 9, wherein establishing the first smart object includes associating any secondary cells disposed adjacent to the at least secondary cell and having collected at least one data vector of the plurality of data vectors with the first smart object.

11. The signal sorting system of claim 9, wherein the at least one processor is configured to store, in the data storage, information corresponding to the at least one primary cell, the information including the first number of data vectors received within the at least one primary cell and a time of receipt of a most recently received data vector within the at least one primary cell.

12. The signal sorting system of claim 11, wherein the at least one processor is further configured to delete from the data storage the information corresponding to the at least one primary cell based on an amount of time, measured since the time of receipt and during which no further data vectors are received within the at least one primary cell, exceeding a predetermined threshold.

13. The signal sorting system of claim 9, wherein the process further comprises:

establishing a second smart object based on a third number of data vectors received within an additional secondary cell exceeding the second threshold value;

determining that the first and second smart objects share a common boundary;

determining that the first and second smart objects were not previously merged; and merging the first and second smart objects to form a single third smart object.

14. The signal sorting system of claim 9, wherein the process further comprises:

determining that the first smart object contains two or more distributions of data vectors;

determining a divergence between the two or more distributions of data vectors; and based on the divergence exceeding a predetermined threshold, splitting the first smart object into multiple smart objects, each smart object of the multiple smart objects being associated with one of the two or more distributions.

15. The signal sorting system of claim 14, wherein splitting the first smart object into multiple smart objects includes:

evaluating, for each secondary cell associated with the first smart object, probabilities that the secondary cell corresponds to each of the two or more distributions; and based on the probabilities, assigning each secondary cell to one of the two or more distributions.

16. A method of sorting radar signals, the method comprising:

receiving, via a radar signal receiver, a plurality of radar signals from one or more signal source or emitters within a field of regard of the radar signal receiver, the radar signal receiver being configured to convert the plurality of radar signals into a plurality of data vectors representing a plurality of radar signals, each of the plurality of data vectors comprising measured radar-signal parameters including a first radar signal parameter and a second radar signal parameter of a corresponding radar signal within the field of regard;

establishing a sparse primary grid over the field of regard of the radar signal receiver, the sparse primary grid including at least one primary cell in which at least one data vector of the plurality of data vectors has been received;

based on a first number of data vectors received within the primary cell exceeding a first threshold value, establishing a sparse secondary grid within the primary cell, the sparse secondary grid including at least one secondary cell in which one or more data vectors of the plurality of data vectors have been received;

based on a second number of data vectors received within the at least one secondary cell exceeding a second threshold value, establishing a first smart object corresponding to the at least one secondary cell, the first smart object identifying one or more radar signals represented by the one or more data vectors received within the at least one secondary cell;

associating the one or more data vectors received within the at least one secondary cell with the first smart object;

applying a radar signal processing operation to the one or more data vectors associated with the first smart object instead of applying the radar signal processing operation to every data vector of the plurality of data vectors;

determining that the first smart object contains two or more distributions of data vectors;

determining a divergence between the two or more distributions of data vectors; and based on the divergence exceeding a predetermined threshold, splitting the first smart object into multiple smart objects, each smart object of the multiple smart objects being associated with one of the two or more distributions.

17. The method of claim 16, further comprising:

establishing a second smart object based on a third number of data vectors received within an additional secondary cell exceeding the second threshold value;

determining that the first and second smart objects share a common boundary;

determining that the first and second smart objects were not previously merged; and merging the first and second smart objects to form a single third smart object.

* * * * *